US012762233B2

(12) United States Patent
Bhatia et al.

(10) Patent No.: US 12,762,233 B2
(45) Date of Patent: Oct. 13, 2026

(54) SELECTIVELY PRIORITIZING ALERTS RECEIVED FOR AN ADVANCED CYBERSECURITY THREAT PRIORITIZATION SYSTEM

(71) Applicant: International Business Machines Corporation, Armonk, NY (US)

(72) Inventors: Aankur Bhatia, Bethpage, NY (US); Namrata Tolani, Bangalore (IN); Erin Hwang, New York, NY (US); Abhishek Basu, Kolkata (IN); Ajmeera Balaji Naik, Reddigudem Mandal (IN); Ikenna Precious Chima, New York, NY (US); Oleksandr Shmaliy, Wroclaw (PL); Adrian Mahjour, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 327 days.

(21) Appl. No.: 18/369,030

(22) Filed: Sep. 15, 2023

(65) Prior Publication Data

US 2025/0094582 A1 Mar. 20, 2025

(51) Int. Cl.
*G06F 21/56* (2013.01)
*G06F 21/55* (2013.01)

(52) U.S. Cl.
CPC .......... *G06F 21/564* (2013.01); *G06F 21/552* (2013.01); *G06F 2221/034* (2013.01)

(58) Field of Classification Search
CPC .... G06F 21/564; G06F 21/552; G06F 21/577; G06F 2221/034; H04L 63/1433
See application file for complete search history.

(56) References Cited

U.S. PATENT DOCUMENTS 9,548,987 B1 * 1/2017 Poole .................. H04L 63/1416
9,558,346 B1 * 1/2017 Kolman .................. G06F 21/51
(Continued)

FOREIGN PATENT DOCUMENTS

| | | | |
|---|---|---|---|
| AU | 2017421179 | B2 | 10/2022 |
| CN | 119652541 | A | 3/2025 |
| JP | 2025-043303 | A | 3/2025 |

OTHER PUBLICATIONS

Tsakalidis et al., "Cybersecurity threats: a proposed system for assessing threat severity," Proceedings of the fourth International Conference on Decision Support System Technology—ICDSST, 2018, pp. 1-8.

(Continued)

*Primary Examiner* — David Garcia Cervetti
(74) *Attorney, Agent, or Firm* — Gavin Giraud

(57) ABSTRACT

A computer-implemented method, according to one approach includes having a historical risk score generated for a current cybersecurity event in response to detecting the current cybersecurity event. A sigma rule detection score is also generated for the current cybersecurity event, in addition to an anomaly risk score that is generated for the current cybersecurity event. An IoC score is further generated for the current cybersecurity event. A machine learning model is used to evaluate the historical risk score, the sigma rule detection score, the anomaly risk score, and the IoC score. The machine learning model is also used to create a consolidated risk score corresponding to: the current cybersecurity event, the consolidated risk score incorporating the historical risk score, the sigma rule detection score, the anomaly risk score, and the IoC score.

23 Claims, 10 Drawing Sheets

(56) References Cited

U.S. PATENT DOCUMENTS 9,680,938 B1 * 6/2017 Gil .................... H04L 67/142
9,800,605 B2 * 10/2017 Baikalov ............ H04L 63/1433
10,467,419 B1 * 11/2019 Youngberg .......... G06F 21/566
10,491,619 B2 * 11/2019 Yampolskiy ........ H04L 61/2503
10,587,642 B1 3/2020 Herman-Saffar et al.
10,630,703 B1 * 4/2020 Ghosh ............... H04L 63/1408
10,630,704 B1 * 4/2020 Ghosh ............... H04L 63/1416
10,630,716 B1 * 4/2020 Ghosh ............... H04L 63/1408
10,666,666 B1 * 5/2020 Saurabh ............ H04L 63/1425
10,713,586 B2 7/2020 Lim
10,721,264 B1 7/2020 Dell'Amico et al.
10,771,493 B2 9/2020 Spisak et al.
10,841,338 B1 * 11/2020 Lin ..................... H04L 63/20
10,878,102 B2 * 12/2020 Manadhata .......... G06F 16/244
10,887,335 B2 * 1/2021 Pilkington .......... H04L 63/1425
10,902,114 B1 * 1/2021 Trost ................... G06F 16/26
11,023,585 B1 * 6/2021 Light .................. G06F 21/577
11,113,398 B2 9/2021 Harms et al.
11,423,143 B1 * 8/2022 Lin ..................... G06F 21/552
11,477,231 B2 10/2022 Bubshait et al.
11,489,846 B2 * 11/2022 Almaz ................ G06F 21/566
11,503,063 B2 11/2022 Rao et al.
11,716,346 B1 * 8/2023 Kraemer ............ H04L 63/0876
11,757,907 B1 * 9/2023 Berger .................. G06N 7/01 726/23
11,757,914 B1 * 9/2023 Jakobsson ............ H04L 51/18 726/25
11,816,210 B2 * 11/2023 Cotaie .................. G06N 20/00
11,841,945 B1 * 12/2023 Fogel ................... G06F 21/53
11,888,886 B1 * 1/2024 Kudale .............. H04L 63/1433
12,019,739 B2 * 6/2024 Pan ...................... G06N 5/025
12,135,788 B1 * 11/2024 Sreekanta ........... G06F 16/245
12,323,427 B2 * 6/2025 Hutelmyer ............ H04L 63/20
12,506,747 B1 * 12/2025 Kennedy ............... G06F 18/22
12,506,763 B1 * 12/2025 Lin ................... H04L 63/1433
12,518,005 B2 * 1/2026 Dzeparoska .......... G06F 21/554
12,615,297 B2 * 4/2026 Saripalli ............... H04L 63/20
2013/0318613 A1 * 11/2013 Archer ................ G06F 21/577 726/25
2015/0373039 A1 * 12/2015 Wang ................ H04L 63/1425 726/23
2015/0373043 A1 * 12/2015 Wang ................ G06F 21/6254 706/12
2016/0050225 A1 * 2/2016 Carpenter ............ G06F 21/577 726/25
2016/0203490 A1 * 7/2016 Gupta ................. G06Q 20/308 705/44
2016/0330228 A1 * 11/2016 Knapp ............... G06F 3/04817
2016/0352765 A1 * 12/2016 Mermoud .......... H04L 63/1458
2016/0364663 A1 * 12/2016 Gupta ............... G06Q 30/0205
2017/0149815 A1 * 5/2017 Bolgert .............. H04L 63/1433
2017/0171235 A1 * 6/2017 Mulchandani ........ G06F 21/554
2017/0214707 A1 * 7/2017 Grubel ................ G06F 21/564
2017/0228635 A1 * 8/2017 Diev ...................... G06N 3/02
2018/0004948 A1 * 1/2018 Martin ............... H04L 63/1425
2018/0069876 A1 * 3/2018 Ben Ezra ........... H04L 63/1416
2018/0124091 A1 * 5/2018 Sweeney ............ H04L 63/1433
2018/0139227 A1 * 5/2018 Martin ............... H04L 63/1433
2018/0191763 A1 * 7/2018 Hillard ............... H04L 63/1416
2018/0247312 A1 * 8/2018 Loganathan ....... G06Q 20/4014
2018/0336353 A1 * 11/2018 Manadhata .......... G06F 16/244
2018/0351987 A1 * 12/2018 Patel .................... G06F 21/577
2019/0379678 A1 * 12/2019 McLean ............... G06F 16/285
2020/0045064 A1 * 2/2020 Bindal .................. G06N 20/00
2020/0143060 A1 * 5/2020 Tineo ................... G06F 21/577
2020/0186546 A1 * 6/2020 Dichiu ............... H04L 63/1416
2020/0195679 A1 * 6/2020 Du ..................... H04L 63/1433
2020/0195693 A1 * 6/2020 Price ................... G06F 21/552
2020/0210590 A1 * 7/2020 Doyle ................... G06F 21/577
2020/0242526 A1 * 7/2020 Sampath .......... G06Q 10/06393
2020/0356676 A1 * 11/2020 Gorlamandala ...... G06F 21/577
2020/0382534 A1 * 12/2020 Simanovsky ......... G06F 21/552
2020/0382547 A1 * 12/2020 Basballe Sorensen .................. H04L 63/1433
2021/0042408 A1 * 2/2021 Van Dyke ............ G06F 21/552
2021/0136089 A1 * 5/2021 Costea ................. G06F 21/554
2021/0203687 A1 * 7/2021 Rabin .................. H04L 63/105
2021/0243223 A1 * 8/2021 Arora ................ H04L 63/1491
2021/0273968 A1 * 9/2021 Shaieb ..................... G06F 8/65
2021/0312058 A1 10/2021 Chiarelli et al.
2022/0006899 A1 * 1/2022 Phatak ............... H04M 3/2281
2022/0038489 A1 * 2/2022 Thakur ................ G06F 21/577
2022/0060497 A1 * 2/2022 Crabtree ............... G06N 20/00
2022/0070201 A1 * 3/2022 Almaz ............... H04L 63/1416
2022/0147815 A1 5/2022 Conwell et al.
2022/0247776 A1 * 8/2022 Hecht ................ H04L 63/1433
2022/0261480 A1 * 8/2022 Youngberg .......... G06F 21/105
2022/0263851 A1 * 8/2022 Waldspurger ......... H04L 63/205
2022/0311796 A1 * 9/2022 Doyle ................ H04L 63/1433
2022/0326955 A1 * 10/2022 Chin ...................... G06N 3/09
2022/0329630 A1 10/2022 Li
2022/0345457 A1 * 10/2022 Jeffords ................. H04L 63/10
2022/0360597 A1 * 11/2022 Fellows ............... G06F 21/577
2022/0385687 A1 * 12/2022 McKinley .......... H04L 63/1433
2022/0414206 A1 * 12/2022 Hinkle ................... G06F 21/53
2022/0417263 A1 * 12/2022 Hinkle ................. H04L 63/302
2023/0042671 A1 * 2/2023 Zaman .................... H04L 41/22
2023/0068946 A1 * 3/2023 McCarthy ............ G06F 21/554
2023/0109224 A1 * 4/2023 Shaw ................. H04W 12/088 726/25
2023/0156034 A1 * 5/2023 Naidoo .............. H04L 63/0428 726/23
2023/0196370 A1 * 6/2023 Levine ................. G06F 18/214
2023/0229785 A1 * 7/2023 Jurado ................. G06F 3/0483 726/25
2023/0239303 A1 * 7/2023 Hutelmyer ........... H04L 63/102 726/4
2023/0308460 A1 * 9/2023 Thomas ............... H04L 63/102
2023/0315840 A1 * 10/2023 Cambric ................ G06F 21/34 726/23
2023/0316192 A1 * 10/2023 Roytman .......... G06Q 10/0635 705/7.28
2023/0328084 A1 * 10/2023 Narayanan ........... G06F 21/566 726/23
2023/0336579 A1 * 10/2023 Ellsworth .......... H04L 63/1433
2023/0344840 A1 * 10/2023 Doleh ................ H04L 63/1416
2023/0370495 A1 * 11/2023 Desai ................. H04L 63/1416
2023/0388332 A1 * 11/2023 Cunningham ........ G06F 21/552
2023/0403294 A1 * 12/2023 Bazalgette .......... H04L 63/1433
2023/0412620 A1 * 12/2023 Crabtree ................ H04L 41/12
2024/0080332 A1 * 3/2024 Ganesh .............. H04L 63/1425
2024/0095350 A1 * 3/2024 Withnell .............. G06F 21/554
2024/0098100 A1 * 3/2024 Lal ..................... H04L 63/1416
2024/0098114 A1 * 3/2024 Withnell ............ H04L 63/1441
2024/0121242 A1 * 4/2024 Miyake ................ H04L 63/102
2024/0126889 A1 * 4/2024 Clark ................... G06F 21/577
2024/0129338 A1 * 4/2024 Azad .................. H04L 63/1416
2024/0163312 A1 * 5/2024 Azad ...................... H04L 63/20
2024/0223592 A1 * 7/2024 Bazalgette .......... G06F 9/45558
2024/0223596 A1 * 7/2024 Sellars ............... H04L 63/1433
2024/0305664 A1 * 9/2024 McCarthy .......... H04L 63/1441
2024/0338628 A1 * 10/2024 Ji ....................... G06Q 10/0635
2024/0386099 A1 * 11/2024 Weizman ............. G06F 21/554
2024/0403428 A1 * 12/2024 Lal ....................... G06F 21/554
2024/0406210 A1 * 12/2024 Sellars .................. G06F 21/554
2024/0414190 A1 * 12/2024 Lal ..................... H04L 63/1416
2024/0414211 A1 * 12/2024 Boyer ................ H04L 63/1416
2024/0430289 A1 * 12/2024 Engelberg .......... H04L 63/1433
2025/0007923 A1 * 1/2025 Liu ........................ H04L 63/14
2025/0023871 A1 * 1/2025 Burle ................... H04L 63/105
2025/0023905 A1 * 1/2025 Burle ................. H04L 63/1433
2025/0030744 A1 * 1/2025 Stride ................ H04L 63/1433
2025/0117486 A1 * 4/2025 Pickman .............. G06F 16/353
2025/0225234 A1 * 7/2025 Manickam ........... G06F 21/554
2025/0260715 A1 * 8/2025 Reich ................. H04L 63/1408
2025/0280067 A1 * 9/2025 Phatak ............... H04L 63/1433

OTHER PUBLICATIONS

Zeng et al., "Licality—Likelihood and Criticality: Vulnerability Risk Prioritization Through Logical Reasoning and Deep Learn-

(56) References Cited

OTHER PUBLICATIONS ing," IEEE Transactions on Network and Service Management, vol. 19, No. 2, Jun. 2022, pp. 1746-1760.

* cited by examiner

SELECTIVELY PRIORITIZING ALERTS RECEIVED FOR AN ADVANCED CYBERSECURITY THREAT PRIORITIZATION SYSTEM

BACKGROUND

The present invention relates to evaluating alerts received for a system, and more specifically, this invention relates to providing a comprehensive and accurate assessment of potential threats based on the current operating condition of a system.

The prevalence of computer systems has increased with the advancement of the Internet, and wireless network standards such as Bluetooth™ and Wi-Fi™. Additionally, the adoption and development of smart devices, e.g., such as smartphones, televisions, tablets, and other devices in the Internet of Things (IoT) has increased as processing power and functionality improve.

Further still, electronic source material has a number of benefits compared to physical documents. For example, electronic documents are easier to store and access in comparison to physical documents. While accessing a physical document involves manually searching each document in a collection until the desired document is found, multiple electronic documents can be automatically compared against one or more keywords. Moreover, electronic documents can be uploaded from and/or downloaded to any device connected to a network, while tangible documents (e.g., papers) must be physically transported between locations. Similarly, electronic documents take up much less space than their physical counterparts.

In view of these benefits, an increasing amount of physical material has been digitized. While this digital conversion improves data storage and data accessibility, it also increases the importance of maintaining cybersecurity (e.g., computer security). Cybersecurity involves the protection of computer systems and networks from attacks by malicious actors. Depending on the type(s) of computer systems and/or networks that are affected, a cybersecurity attack may result in unauthorized information disclosure, damage to hardware and/or software, corruption of data, etc. While some platforms have been developed to protect computer systems and networks from such attacks, threats are consistently evolving. Computer systems and networks thereby face various types of events over time.

SUMMARY

A computer-implemented method, according to one approach, includes having a historical risk score generated for a cybersecurity event in response to detecting the cybersecurity event. A sigma rule detection score is also generated for the cybersecurity event, in addition to an anomaly risk score that is generated for the cybersecurity event. An Indicator of Compromise (IoC) score is further generated for the cybersecurity event. A machine learning model is used to evaluate the historical risk score, the sigma rule detection score, the anomaly risk score, and the IoC score. The machine learning model is also used to create a consolidated risk score corresponding to: the cybersecurity event, the consolidated risk score incorporating the historical risk score, the sigma rule detection score, the anomaly risk score, and the IoC score.

A computer program product, according to another approach, includes a computer readable storage medium having program instructions embodied therewith. The program instructions are readable by a processor, executable by the processor, or readable and executable by the processor, to cause the processor to, in response to detecting a cybersecurity event: perform the forgoing method.

An advanced threat prioritization system, according to another approach, includes a processor, as well as logic that is integrated with the processor, executable by the processor, or integrated with and executable by the processor. Moreover, the logic is configured to, in response to detecting a cybersecurity event: perform the foregoing method.

A computer-implemented method, according to another approach, includes training a machine learning module. The machine learning model is trained by collecting information associated with (i) different types of cybersecurity events experienced over time, and (ii) actions taken in response to the respective cybersecurity events that were experienced. The collected information is further inspected to develop a comprehensive understanding of risks associated with the different types of cybersecurity events. The trained machine learning model is also used to evaluate newly received cybersecurity events. As a result, the trained machine learning model is able to generate historical risk scores for the respective new cybersecurity events.

A computer-implemented method, according to still another approach, includes training a machine learning model to generate a consolidated risk score for a cybersecurity event. This involves training the machine learning model to generate a weighted value for each of: a historical risk score, a sigma rule detection score, an anomaly risk score, and an IoC score. The machine learning model is further trained to apply the weighted values to the respective historical risk score, sigma rule detection score, anomaly risk score, and IoC score. The weighted historical risk score, the weighted sigma rule detection score, the weighted anomaly risk score, and the weighted IoC score are also combined by the machine learning model to form the consolidated risk score.

Other aspects and implementations of the present invention will become apparent from the following detailed description, which, when taken in conjunction with the drawings, illustrate by way of example the principles of the invention.

DETAILED DESCRIPTION

Figure 1:
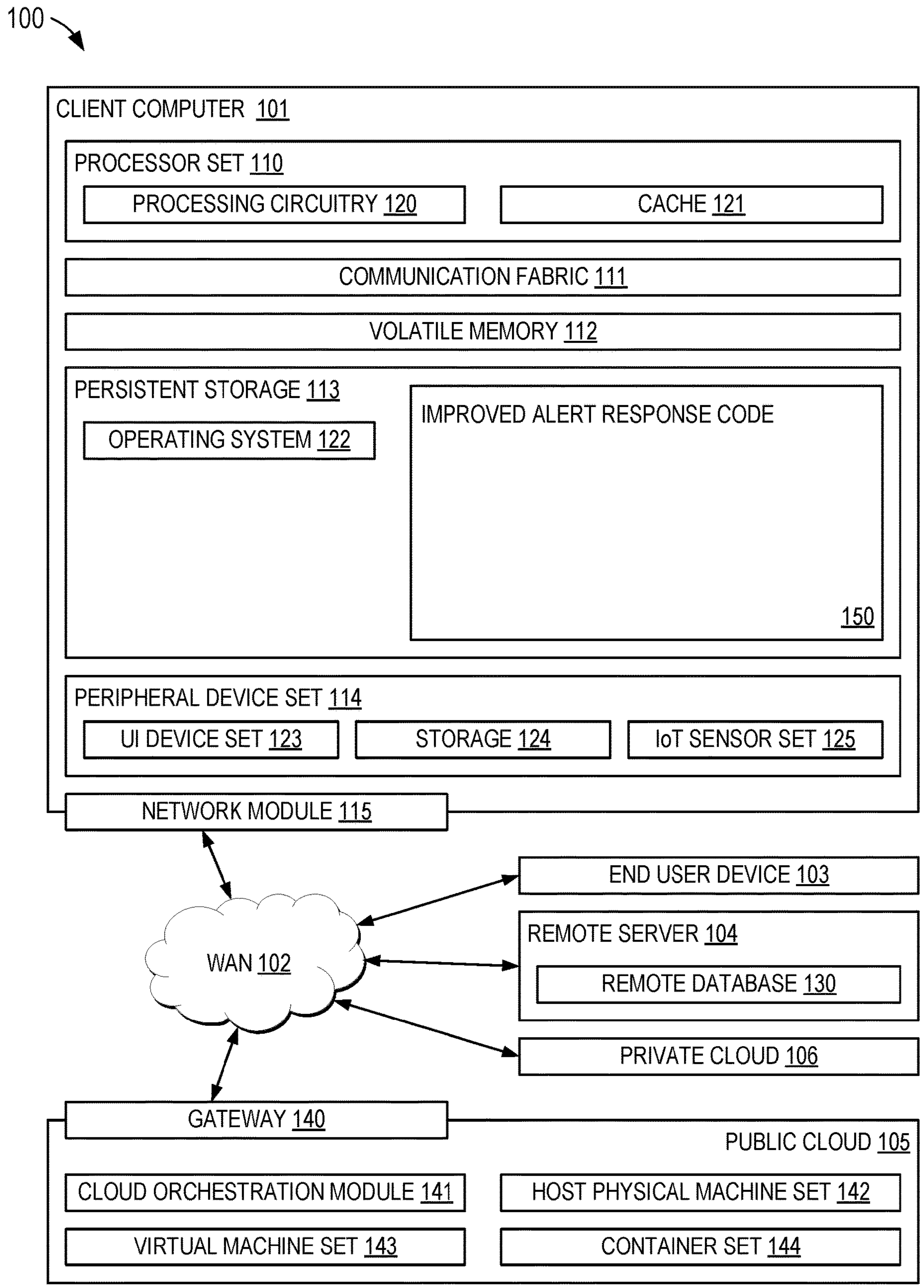
FIG. 1 is a diagram of a computing environment, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for providing a comprehensive and accurate assessment of potential threats based on the current operating situation. Implementations herein are able to generate an assessment of the events that can be used to direct corrective actions performed to overcome the undesirable (e.g., cybersecurity) events experienced. In other words, approaches herein can develop an understanding of events that impact a system, and use that understanding to efficiently respond to situations and restore operational efficiency to the system. Trained machine learning models may be used to develop an understanding of events that contributed to the undesirable event, e.g., as will be described in further detail below.

In one general approach, a computer-implemented method includes causing a historical risk score to be generated for a current cybersecurity event in response to detecting the current cybersecurity event. As noted above, computer-based attacks have posed an increasingly significant threat to computer systems and networks. Moreover, cybersecurity attacks are consistently evolving, increasing the desirability of a system that is able to identify different types of attacks and determine the order in which they should be addressed. Comparing a current cybersecurity event to cybersecurity events and other events that occurred in the past may allow for patterns and other similarities to be identified, providing insight as to how the current cybersecurity event may be addressed most efficiently.

The computer-implemented method also includes causing a sigma rule detection score to be generated for the current cybersecurity event. While some insight may be provided by comparing the present cybersecurity event to historical information, additional evaluations may be made to determine how the current cybersecurity event has affected the underlying system and/or how the current cybersecurity event should be overcome. For instance, it should be noted that "sigma rules" is intended to refer to a collection of rules used for threat detection and security monitoring. The rules are designed to provide a standardized format and may thereby be used to search for patterns and indicators of compromise (IoCs) in log data, making it easier to detect potential security threats. Moreover, the rules may be written to detect a variety of different security threats, including malware, phishing, credential theft, etc.

The computer-implemented method also includes causing an anomaly risk score to be generated for the current cybersecurity event. In other words, evaluating details of the current cybersecurity event may involve determining whether any values are outside an expected range. Anomalies that are detected may provide insight into what contributed to the current cybersecurity event being experienced. This information may further provide insight into how the current cybersecurity event may be addressed and overcome.

The computer-implemented method also includes causing an IoC score to be generated for the current cybersecurity event. The IoC score is also used to quantify performance of the system under the current situation. This may be based on data provided by a threat intelligence service (TIS) which is able to leverage various data sources, e.g., including internal security research, external threat feeds, third-party intelligence sources, etc.

The computer-implemented method also includes using machine learning models to evaluate each of the generated scores. In other words, the machine learning models are used to evaluate the historical risk score, the sigma rule detection score, the anomaly risk score, and the IoC score. These machine learning models may be trained to develop an understanding of events that contributed to the cybersecurity event. Moreover, this understanding allows for the machine learning models to develop a more detailed understanding of how the cybersecurity event may be overcome.

Thus, the computer-implemented method also includes using the machine learning model to create a consolidated risk score. The consolidated risk score is created based on the current cybersecurity event, the consolidated risk score incorporating the historical risk score, the sigma rule detection score, the anomaly risk score, and the IoC score. The consolidated risk score thereby provides a summary that may be used to determine how much impact the cybersecurity event has on the underlying system(s) and/or network(s).

In some implementations, causing the historical risk score to be generated for the current cybersecurity event includes: using another machine learning model to compare the current cybersecurity event to historical cybersecurity events. As mentioned above, comparing a current cybersecurity event to cybersecurity events and other events that occurred in the past may allow for patterns and other similarities to be identified. This desirably provides insight as to how the current cybersecurity event may be addressed most efficiently. It follows that the historical risk score may be based at least in part on the comparison and the corresponding responses to the historical cybersecurity events. In some implementations, comparing the current cybersecurity event to the historical cybersecurity events includes comparing log severity scores, model escalation probabilities, rare scores, and/or observable scores.

In some implementations, determining the historical risk score includes: applying a time decay to the historical cybersecurity events and the corresponding responses. The time decay is preferably used to assign a higher importance to historical events and responses that are more recent (e.g., relevant to the current event), while assigning a lower importance to events and responses that are from farther in the past. Accordingly, more recent events may make a bigger impact than events that occurred farther in the past.

In some implementations, causing the sigma rule detection score to be generated for the current cybersecurity event includes: identifying a number of rules that have been fired as a result of the current cybersecurity event, and determining a risk score based at least in part on the number of fired rules. Again, the rules are designed to provide a standardized format and may thereby be used to search for patterns and IoCs in log data, making it easier to detect potential security threats.

In some implementations, causing the sigma rule detection score to be generated for the current cybersecurity event includes: normalizing the determined risk score. Normalizing the risk score may assist with properly quantifying the risk score in comparison to other events. For instance, a normalized risk score may be in a same unit of measure as other normalized risk scores, thereby improving the ability to compare risk scores.

In some implementations, causing the anomaly risk score to be generated for the current cybersecurity event includes: inspecting information associated with the current cybersecurity event and identifying anomalies in the information. Again, anomalies may point to portions of the information that indicate a source of the cybersecurity event. These anomalies may thereby help direct responses to the cybersecurity event.

In some implementations, causing the anomaly risk score to be generated for the current cybersecurity event further includes: determining a numeric value for each of the anomalies. The numeric values preferably indicate an amount that the respective anomalies deviate from a majority of the information associated with the current and/or previous cybersecurity events. The severity by which the anomalies differ from an expected value may thereby be used to determine how impactful the current cybersecurity event is on the system.

In some implementations, causing the IoC score to be generated for the current cybersecurity event includes: inspecting information associated with the current cybersecurity event, and identifying one or more types of IoCs in the information. Identifying IoCs that are related to the current cybersecurity event assists in quantifying performance of the system under the current situation. This may be based on data provided by a TIS which is able to leverage various data sources, e.g., including internal security research, external threat feeds, third-party intelligence sources, etc. Moreover, the one or more types of IoCs identified in the information are determined based on the current cybersecurity event.

In some implementations, the identified IoCs are compared to information associated with historical cybersecurity events. Accordingly, the IoC score is determined based at least in part on overlaps between the identified IoCs and past events. Again, by comparing current information to historical records, patterns may be identified and used to shape how the current cybersecurity event is overcome.

In some implementations, using the machine learning model to create the consolidated risk score includes generating a weighted value for each of: the historical risk score, the sigma rule detection score, the anomaly risk score, and the IoC score. Moreover, the weighted values are applied to each of the respective scores.

Different weighing values may be applied to different types of risk scores. For instance, one or more machine learning models that have been trained to apply weights to each type of risk score. According to some approaches, a weighted value may be determined for a given risk score by identifying an amount that the given score changes in response to a single feature value being shuffled. In other words, machine learning models evaluate the amount that a model score decreases in response to a single feature value being randomly shuffled. This procedure effectively breaks the relationship between the feature and the target. Accordingly, a decrease in the model score indicates the amount by which the given model depends on the feature. As a result, the importance of the feature may be used as an indicator of the appropriate weight that should be assigned to the risk score given the current situation. It follows that the weighted historical risk score, the weighted sigma rule detection score, the weighted anomaly risk score, and the weighted IoC score are combined in some implementations to form the consolidated risk score.

In some implementations, an advanced threat prioritization system includes a historical risk score module that is configured to generate the historical risk score, a sigma rule detection score module that is configured to generate the sigma rule detection score, an anomaly risk score module that is configured to generate the anomaly risk score, and an IoC score module that is configured to generate the IoC score. Moreover, machine learning models herein may be trained using random forest classifiers and/or permutation importance algorithms to generate weighted values for each of the historical risk score, the sigma rule detection score, the anomaly risk score, and the IoC score. A training layer may use these algorithms to learn appropriate weights for the different individual scores. For example, the Random Forest Classifier algorithm may be used to ensure the individual scores are able to make meaningful predictions on the overall outcome of the alert. Permutation Importance algorithms may also be used to calculate the individual weights for each of the individual scores.

In another general approach, a computer program product includes a computer readable storage medium having program instructions embodied therewith. The program instructions are readable by a processor, executable by the processor, or readable and executable by the processor, to cause the processor to, in response to detecting a cybersecurity event: perform the forgoing method.

In yet another general approach, an advanced threat prioritization system includes a processor, as well as logic that is integrated with the processor, executable by the processor, or integrated with and executable by the processor. Moreover, the logic is configured to, in response to detecting a cybersecurity event: perform the foregoing method.

In another general approach, a computer-implemented method includes training a machine learning module. The machine learning model is trained by collecting information associated with (i) different types of cybersecurity events experienced over time, and (ii) actions taken in response to the respective cybersecurity events that were experienced. The computer-implemented method also includes inspecting the collected information to develop a comprehensive understanding of risks associated with the different types of cybersecurity events. Again, by comparing a current cybersecurity event to cybersecurity events and other events that occurred in the past may allow for patterns and other similarities to be identified while training the machine learning model(s). This desirably provides insight as to how the current cybersecurity event may be addressed most efficiently.

The computer-implemented method also includes using the trained machine learning model to evaluate newly received cybersecurity events and generate historical risk scores for the respective new cybersecurity events. It follows that although some situations involve receiving cybersecurity events that have not yet been experienced, the machine learning model is able to provide valuable insight by comparing the new events to events that happened in the past, e.g., to make correlations. This allows the machine learning model to efficiently evaluate and provide insight on how to address events as they occur in real-time.

A computer-implemented method, according to still another approach, includes training a machine learning model to generate a consolidated risk score for a cybersecurity event. This involves training the machine learning model to generate a weighted value for each of: a historical risk score, a sigma rule detection score, an anomaly risk score, and an IoC score. Different weighing values may be applied to different types of risk scores. For instance, one or more machine learning models that have been trained to apply weights to each type of risk score. According to some approaches, a weighted value may be determined for a given risk score by identifying an amount that the given score changes in response to a single feature value being shuffled. In other words, machine learning models evaluate the amount that a model score decreases in response to a single feature value being randomly shuffled. This procedure effectively breaks the relationship between the feature and the target. Accordingly, a decrease in the model score indicates the amount by which the given model depends on the feature. As a result, the importance of the feature may be used as an indicator of the appropriate weight that should be assigned to the risk score given the current situation. It follows that the weighted historical risk score, the weighted sigma rule detection score, the weighted anomaly risk score, and the weighted IoC score are combined in some implementations to form the consolidated risk score.

Accordingly, the computer-implemented method also includes training the machine learning model to apply the weighted values to the respective scores. The weighted scores are also combined by the machine learning model to form the consolidated risk score.

Various aspects of the present disclosure are described by narrative text, flowcharts, block diagrams of computer systems and/or block diagrams of the machine logic included in computer program product (CPP) implementations. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product (CPP) is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved alert response code at block 150 for providing a comprehensive and accurate assessment of potential threats based on the current operating situation. In addition to block 150, computing environment 100 includes, for example, computer 101, wide area network (WAN) 102, end user device (EUD) 103, remote server 104, public cloud 105, and private cloud 106. In this implementation, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various implementations, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some implementations, storage 124 may take the form of a quantum computing storage device for storing data in the form of qubits. In implementations where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some implementations, network control functions and network forwarding functions of network module 115 are performed on the same physical hardware device. In other implementations (for example, implementations that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some implementations, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some implementations, EUD 103 may be a client device, such as thin client, heavy client, mainframe computer, desktop computer and so on.

REMOTE SERVER 104 is any computer system that serves at least some data and/or functionality to computer

101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other implementations a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this implementation, public cloud 105 and private cloud 106 are both part of a larger hybrid cloud.

In some aspects, a system according to various implementations may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various implementations.

As noted above, the prevalence of computer systems has increased with the advancement of the Internet, and wireless network standards such as Bluetooth and Wi-Fi. Additionally, the adoption and development of smart devices, e.g., such as smartphones, televisions, tablets, and other devices in the Internet of Things (IoT) has increased as processing power and functionality improve.

Further still, electronic source material has a number of benefits compared to physical documents. For example, electronic documents are easier to store and access in comparison to physical documents. While accessing a physical document involves manually searching each document in a collection until the desired document is found, multiple electronic documents can be automatically compared against one or more keywords. Moreover, electronic documents can be uploaded from and/or downloaded to any device connected to a network, while tangible documents (e.g., papers) must be physically transported between locations. Similarly, electronic documents take up much less space than their physical counterparts.

In view of these benefits, an increasing amount of physical material has been digitized. While this digital conversion improves data storage and data accessibility, it also increases the importance of maintaining cybersecurity (e.g., computer security). Again, cybersecurity involves the protection of computer systems and networks from attacks by malicious actors. Depending on the type(s) of computer systems and/or networks that are affected, a cybersecurity attack may result in unauthorized information disclosure, damage to hardware and/or software, corruption of data, etc. While some platforms have been developed to protect computer systems and networks from such attacks, threats are consistently evolving. Computer systems and networks thereby face various types of attacks over time.

As the importance of computer systems and networks continue to increase, cybersecurity attacks pose an increasingly significant threat. Cybersecurity has thereby become a significant challenge due to the complexity of computer systems in general, as well as the broad application of computer networks. While conventional products have attempted to resolve security alerts and indicators that are received from various sources such as security information and event management (SIEM) and endpoint detection and response (EDR), these conventional products have been unable to address a number of situations involving computer and network security.

These conventional products have struggled to identify the severity of each incident being reported. Accordingly, the conventional products are completely unable to prioritize different security situations, or even identify which incidents could potentially cause damage to operation. While some attempts to evaluate empirical data have been made in an attempt to improve performance, this threat information is often old and redundant. Additionally, multiple enrichment sources may contradict each other, making them ineffective to evaluate.

Accordingly, there exists a need to develop an intelligent system that is able to utilize artificial intelligence to automatically evaluate events and calculate the consolidated risk to cybersecurity from different indicators, including historical risk. Such a system is preferably dynamic enough to add new and remove redundant indicators of risk, as well as apply suitable weights to each indicator. By implementing this system, approaches herein are able to ensure a more efficient and effective security response to potentially harmful events. This can significantly minimize the risk of cybersecurity threats to computer systems and networks, e.g., as will be described in further detail below.

It follows that in sharp contrast to the shortcomings of conventional products, implementations herein are able to provide a comprehensive and accurate assessment of potential security threats. For instance, an ATPS may be used to detect cybersecurity events that occur, and evaluate the threat they pose to an underlying system. Some approaches may even generate assessment of the events that can be used to direct corrective actions performed to overcome the cybersecurity events experienced. In other words, approaches herein can develop an understanding of events that impact the cybersecurity of a system, and use that understanding to efficiently respond to situations and restore cybersecurity to the system. Trained machine learning models may be used to develop an understanding of events that contributed to the cybersecurity event, e.g., as will be described in further detail below.

Figure 2A:
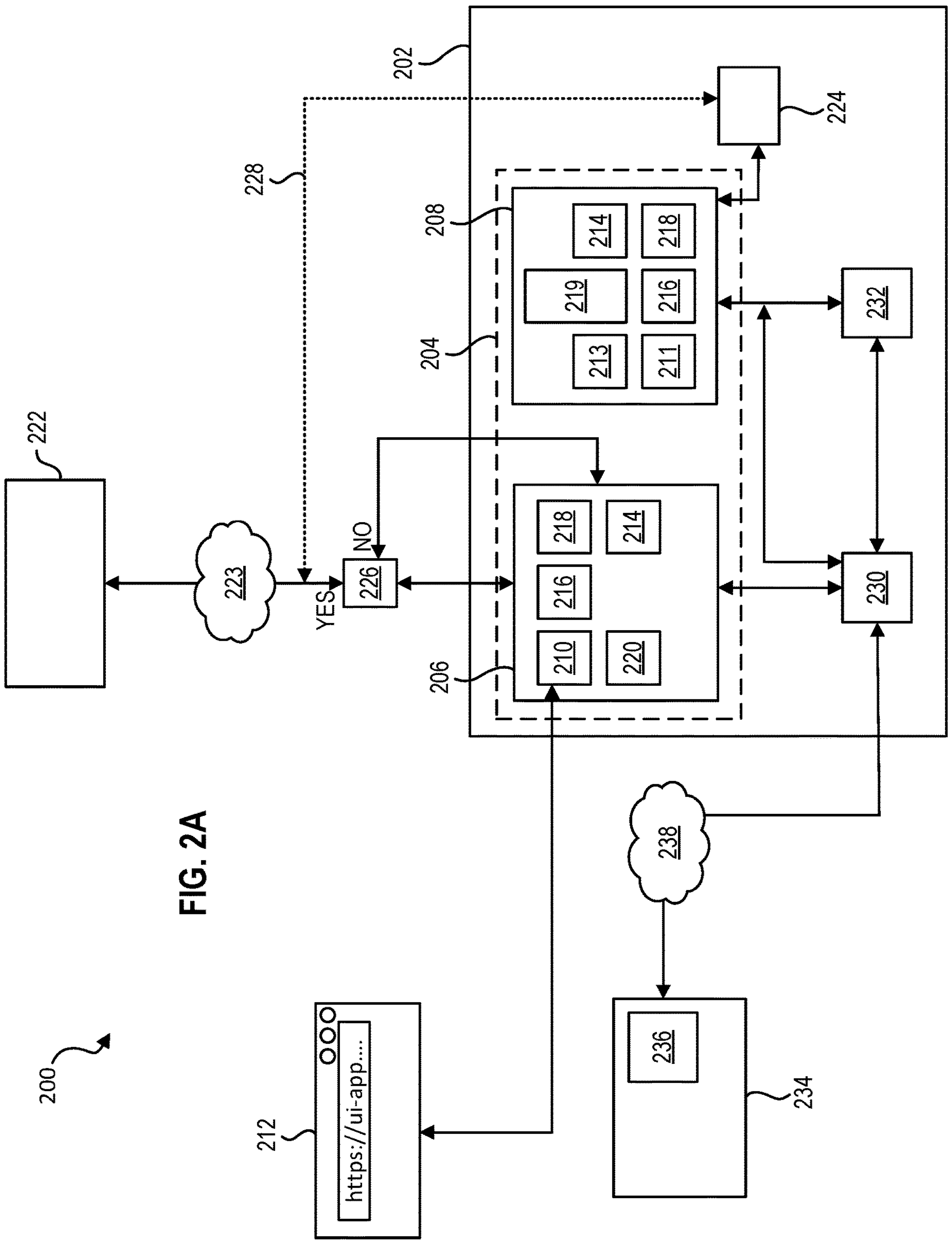
FIG. 2A is a representational view of a distributed system having an advanced threat prioritization system (ATPS), in accordance with one approach.

Looking now to FIG. 2A, a distributed system 200 having an ATPS 202 configured to detect and respond to cybersecurity events, is illustrated in accordance with one approach. As an option, the present system 200 and/or ATPS 202 may be implemented in conjunction with features from any other approach listed herein, such as those described with reference to the other FIGS., such as FIG. 1. However, such system 200, ATPS 202, and others presented herein may be used in various applications and/or in permutations which may or may not be specifically described in the illustrative approaches or implementations listed herein. Further, the system 200 and/or ATPS 202 presented herein may be used in any desired environment. Thus FIG. 2A (and the other FIGS.) may be deemed to include any possible permutation.

As shown, the system 200 includes the ATPS 202 which is preferably configured to evaluate attacks that impact (or are intended to impact) computer systems and/or computer networks. It follows that the ATPS 202 may receive event information from a number of locations that are evaluating signals (e.g., commands) received and/or operations that are performed. Accordingly, ATPS 202 is connected to a number of distributed locations and/or components.

Looking to the ATPS 202, a machine learning module 204 having a machine learning model training layer 206 and a machine learning model application layer 208 is depicted. The machine learning model training layer 206 may receive information from various locations, and use the received information to train machine learning models. Moreover, machine learning model application layer 208 may use the machine learning model trained in layer 206, to evaluate events as they occur in real-time.

Looking to the machine learning model training layer 206, a user interface node 210 receives information directly from a user interface 212. The received information may provide access to the Internet, running software applications, other systems, etc., through a user interface 212. It follows that although not shown, the user interface may be connected to a network that provides access to a website at a specific uniform resource locator (URL) address. It follows that information received at the user interface node 210 may be used to train machine learning models based on a user's actions over time. Accordingly, the machine learning models may be able to identify patterns in user actions and make predictions on how those user actions will impact performance of the ATPS 202 and/or the greater system 200 as a whole.

It follows that machine learning model training layer 206 is preferably able to train machine learning models to evaluate events that are experienced (e.g., cybersecurity events) and develop an understanding of those experienced events. For instance, in some approaches a machine learning module may be trained by first collecting information associated with (i) different types of cybersecurity events experienced over time, and (ii) actions taken in response to the respective cybersecurity events that were experienced. This information may be stored in memory, copied to other locations, consolidated, etc. Upon inspecting the collected information, the machine learning model(s) may thereby be able to develop a comprehensive understanding of risks associated with the different types of cybersecurity events. Furthermore, the machine learning may be used to evaluate newly received (e.g., experienced) cybersecurity events and develop a value that provides insight as to how the newly received cybersecurity events compare to what has historically been experienced and evaluated.

Other machine learning models may also be trained by machine learning model training layer 206. For instance, one or more machine learning models may be trained to generated a consolidated risk score for a cybersecurity event, which represents the overall risk the cybersecurity event poses to the successful operation of an underlying system. For instance, the machine learning model may be trained to generate a weighted value for each of: a historical risk score, a sigma rule detection score, an anomaly risk score, and an IoC score. Accordingly, the machine learning model is able to emphasize certain risk scores and mute others according to the specific cybersecurity event being experienced or evaluated. The weighted values may thereby be applied to the respective historical risk score, sigma rule detection score, anomaly risk score, and IoC score. Furthermore, the machine learning model may be able to combine the weighted historical risk score, the weighted sigma rule detection score, the weighted anomaly risk score, and the weighted IoC score to form the consolidated risk score, e.g., as will be described in further detail below.

ATPS 202 also includes an anomaly detection node 214 that may be used to inspect information (e.g., data, commands, performed operations, etc.) to determine whether any anomalies are present. With respect to the present description, an "anomaly" may include any values or results that deviate from what is expected. Accordingly, the anomaly detection node 214 may include one or more machine learning models that have been trained using information previously received at the ATPS 202.

Similarly, language processing node 216 may include an ontology driven system that has been trained to perform natural language querying over relational data stores. Moreover, threat detection node 218 may include machine learning models that have been trained to identify potential threats (e.g., cybersecurity threats) based on received information that is associated with operation of the system. As noted above, the machine learning models may be trained using information as it is received over time. Accordingly, performance of the ATPS 202 and system 200 as a whole is able to improve further over time as the machine learning models become more effective at identifying potential issues and generating an accurate understanding of how each issue might impact the underlying system.

Scoring node 220 may also include one or more machine learning models that have been trained to apply weights to each of the different types of information received by the other nodes in training layer 206. The information may be weighted by evaluating the received information and comparing certain portions to each other and/or historical information associated with previous performance. As a result, the scoring node 220 may be able to evaluate how much a given situation is predicted to impact performance of the system. This evaluation and prediction may further be used to generate an accurate understanding of what risks different situations (such as cybersecurity attacks) pose, e.g., as will be described in further detail below with respect to method 300.

Referring still to FIG. 2A, the machine learning model training layer 206 is also connected to a cloud server 222 (e.g., central server) over network 223. However, information being sent to the cloud server 222 may first be evaluated to determine whether it should be incorporated into the other information stored at cloud server 222. For instance, the information may have been extracted from a failed operation, an unsatisfactory result, etc. It follows that in some situations it is undesirable for certain information to be incorporated into existing models and/or data repositories. Data inspection module 226 thereby evaluates data sent from training layer 206. Data determined by the inspection module 226 as being desirable for cloud server 222 may thereby be sent over network 223. However, data determined as not being desirable for cloud server 222 may be returned to training layer 206, as shown.

The configuration and/or capabilities of the cloud server 222 may vary depending on the approach. For example, in some implementations the cloud server 222 may include a large (e.g., robust) processor that is coupled to a cache, a machine learning module, and a data storage array having a relatively high storage capacity. The cloud server 222 may thereby be used to process and store a relatively large amount of data, notes, and other information that is received over time in correlation with computer system 200 and/or other systems. This allows the cloud server 222 to connect to the machine learning model training layer 206 and provide compute throughput that assists with continuing to train the machine learning models.

Cloud server 222 is also shown as being connected to the machine learning model application layer 208 through processor 224. This connection (represented by dashed line 228) may be used to pull trained machine learning models and historical (e.g., previous) events from training module 206 and/or cloud server 222, to evaluate a current situation. In preferred approaches, machine learning models are used to compare the current situation to other situations that happened in the past. This comparison allows for the machine learning models to determine a relative risk associated with the current situation based on past occurrences that are sufficiently similar to the current one. For example, cybersecurity events may be compared to determine a relative level of similarity therebetween based on one or more factors, such as log severity scores, model escalation probabilities, rare scores, observable scores, as well as others.

It should be noted that cloud server 222 may also receive information over time that corresponds to actual use of the machine learning models that are trained in training layer 206. This in-use information may be evaluated by the actual machine learning models and used to make predictions as well as suggest operations intended to overcome undesirable situations. For example, cybersecurity events experienced over time may be evaluated and used to further train machine learning models on how to overcome similar or the same events in the future.

The machine learning model application layer 208 may also be able to receive (e.g., pull or request) machine learning models that have been generated, trained, and applied over time. Accordingly, the application layer 208 may work in combination with the training layer 206 to maintain machine learning models that are able to evaluate present events. These machine learning models may be applied to newly experienced events (e.g., cybersecurity attacks) to evaluate details and determine a real-time analysis of the situation. The application layer 208 may thereby include at least some of the same or similar nodes as the training layer 206. In other words, at least some of the nodes in application layer 208 may be developed and improved over time in the training layer 206 before being implemented in the application layer 208.

Specifically, application layer 208 is shown as including anomaly detection node 214, language processing node 216, threat detection node 218, and cumulative risk scoring node 219, e.g., as seen in training layer 206. Additionally, application layer 208 includes a threat scoring node 211 and a sigma node 213, each of which may be used to evaluate different details of a particular event being experienced. For instance, nodes 211, 213, 214, 216, 218, 219 may be used to evaluate different aspects of a cybersecurity event being experienced. It follows that updates to the nodes in application layer 208 may be made over time as performance changes in response to experiencing a specific type of event, thereby impacting the training layer 206.

In response to evaluating each of the different aspects using the different nodes 211, 213, 214, 216, 218, 219, the application layer 208 is able to generate an indication of how newly experienced events are predicted to affect a system. This indication thereby reveals a relative severity of an event compared to other events (e.g., situations) currently being experienced or which were experienced in the past. Implementations herein are thereby able to address events in an order that corresponds to the given situation. For example, events that pose a greater risk to a computer system and/or network may selectively be addressed before other events that do not impact security of the system and/or network. This allows for current operating procedures of a system to be made more efficient by providing insight that helps better understand events (e.g., situations) that arise. These events may be easily compared against each other and managed according to approaches described herein.

Referring still to FIG. 2A, the training layer 206 is connected to a controller 230, while application layer 208 is connected to inference module 232. The controller 230 is shown as receiving data from the application layer 208, e.g., in response to one or more machine learning models being used to evaluate a given event. The controller 230 may thereby direct at least some of this received data back into the training layer 206 such that the machine learning models may continue to be trained and improved using results from actual use. Moreover, inference module 232 may be used to generate a relative risk score for each of the events that are detected by the ATPS 202, e.g., as will be described in further detail below.

Controller 230 is also connected to a security module 234 having a processor 236. The security module 234 and processor 236 may be configured to implement a relational database management system which organizes data into one or more data tables. In the data tables, relationships may be established between portions of the data, thereby structuring the data. Based on the structured understanding of the data, the security module 234 may identify potential security threats. For instance, the security module 234 may be configured to detect cybersecurity events that occur, and evaluate the threat they pose to the underlying ATPS 202. Some approaches may even generate assessment of the events that can be used to direct corrective actions performed to overcome the cybersecurity events experienced. In other words, approaches herein can develop an understanding of events that impact the cybersecurity of a system, and use that understanding to efficiently respond to situations and restore cybersecurity to the system.

It follows that raw alerts may be received from the security module 234 over network 238 in response to data being evaluated using processor 236, e.g., as would be appreciated by one skilled in the art after reading the present description. It should also be noted that network 223 and/or 238 may be of any type, e.g., depending on the desired approach. For instance, networks 223 and/or 238 may be a WAN, e.g., such as the Internet. However, an illustrative list of other potential network types includes, but is not limited to, a LAN, a PSTN, a SAN, an internal telephone network, etc. As a result, any desired information, data, commands, instructions, responses, requests, etc., may be sent between the ATPS 202 and (i) the cloud server 222, (ii) the user interface 212, (iii) the security module 234, and/or combinations thereof, regardless of the amount of separation which exists therebetween.

Referring now to FIGS. 2B-2F, risk scoring modules having detailed views of the components in the different nodes 211, 213, 214, 216, 218, 219 are illustrated in accordance with different approaches. It follows that one or more of the nodes illustrated in FIGS. 2B-2F may be developed (e.g., trained) in training layer 206 and/or used in modules of the application layer 208 to evaluate a given situation identified by ATPS 202 of FIG. 2A. However, it should be noted that the components in any of FIGS. 2B-2F are illustrated in accordance with certain approaches which are in no way intended to limit the invention.

Figure 2B:
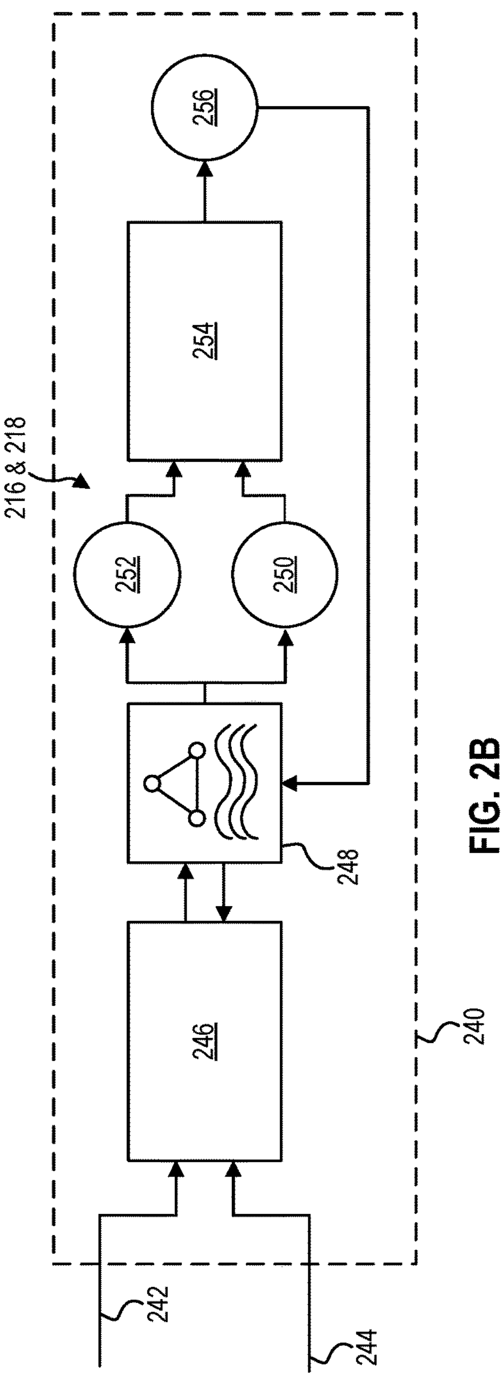
FIG. 2B is a detailed view of one of the nodes in the ATPS of FIG. 2A, in accordance with one approach.

Looking first to FIG. 2B, the language processing node 216 and threat detection node 218 are combined to form a historical risk scoring module 240 having components therein that are configured to generate a risk score for the current situation (e.g., event) being experienced. The risk score may be calculated by the historical risk scoring module 240 by evaluating different types of alerts that are received and comparing them to previously experienced situations. For instance, security information and event management (SIEM) alerts 242 and/or endpoint detection and response (EDR) alerts 244 are received at the historical risk scoring module 240 by a magistrate 246. The magistrate 246 keeps the different types of alerts separated and may also keep a record of the alerts that are received (e.g., in a lookup table).

From the magistrate 246, the received SIEM and EDR alerts are provided to a topic module 248. The module 248 may be used to extract topic information from each of the alerts that are received, thereby providing insight into how each of the alerts may impact the system. These topics may be stored in memory in some approaches, while in other approaches, extracted topic information may be provided to endpoints 250, 252, e.g., as will soon become apparent.

The module 248 also receives feedback from risk scoring endpoint 256. In some approaches, module 248 receives a response from endpoint 256 which contains JavaScript Object Notation (JSON) data (e.g., one or more strings; numbers; objects; arrays; Boolean values; null) in the body of the response. The response may also include a Content-Type header, response status, status message, etc. It follows that the received feedback may impact the topic information extracted from received alerts, e.g., as would be appreciated by one skilled in the art after reading the present description.

From module 248, the alerts are sent to endpoints 250, 252. The received alerts are preferably separated such that the different types of alerts are sent to different ones of the endpoints 250, 252. For instance, SIEM alerts are sent to endpoint 252, while EDR alerts are sent to endpoint 250. According to one example, while is in no way intended to limit the invention, endpoint 252 may be an advanced threat disposition system (ADTS) endpoint, while endpoint 250 is an Athena-based endpoint. Endpoints 250, 252 may each thereby be running microcode at a particular point in the machine learning process to evaluate a specific type of received alerts.

Predictions, evaluations, and other types of analysis is output from endpoints 250, 252 in response to inspecting each of the received alerts. As noted above, this information is produced as a result of training the machine learning models on past events and how they were addressed. Information output from endpoints 250, 252 is provided to a risk scoring engine 254 which includes one or more machine learning models that have been trained to generate a relative historical risk score for the received alerts.

The historical risk score generated for one or more related alerts may represent the likelihood that the alerts will ultimately result in the overarching system being negatively affected and/or by how much. Moreover, this is based on patterns and other relationships identified by trained machine learning models trained using historical (e.g., past) performance of the system. Risk scores may thereby be used to prioritize certain alerts that correspond to a much higher risk of detriment to the system, while choosing to hold off on addressing alerts that correspond to less serious situations. This allows for the system to be maintained efficiently by proactively addressing each of the issues before they impact performance.

In some approaches, the risk scoring engine 254 uses a random forest regressor that considers various features in the received information (e.g., alerts), such as log severity score, model escalation probability, rare score, observable score, and similar alert counts. To ensure accuracy, the risk scoring engine 254 also uses historical escalation score values as a ground truth. Thus, by calculating a score that represents the risk of an alert from a historical perspective, the risk scoring engine 254 and historical risk scoring module 240 as a whole is able to prioritize alerts and provide security analysts with a clearer picture of potential threats.

Endpoint 256 further evaluates the risk scores that are generated by engine 254, returning feedback to module 248. As noted above, in some approaches, module 248 receives a response from endpoint 256 which contains JSON data in the body of the response. Accordingly, endpoint 256 may be configured to extract JSON data from the risk scores generated by risk scoring engine 254.

It follows that machine learning has proven to be an effective tool in providing risk scores for SIEM and EDR alerts. For instance, by leveraging historical learning and analyst response, the system can be trained on data collected from previous alerts as well as the actions that were taken in response to the alerts. This allows the machine learning models (e.g., algorithms) to develop a comprehensive understanding of the risks associated with different types of alerts that are received.

Figure 2C:
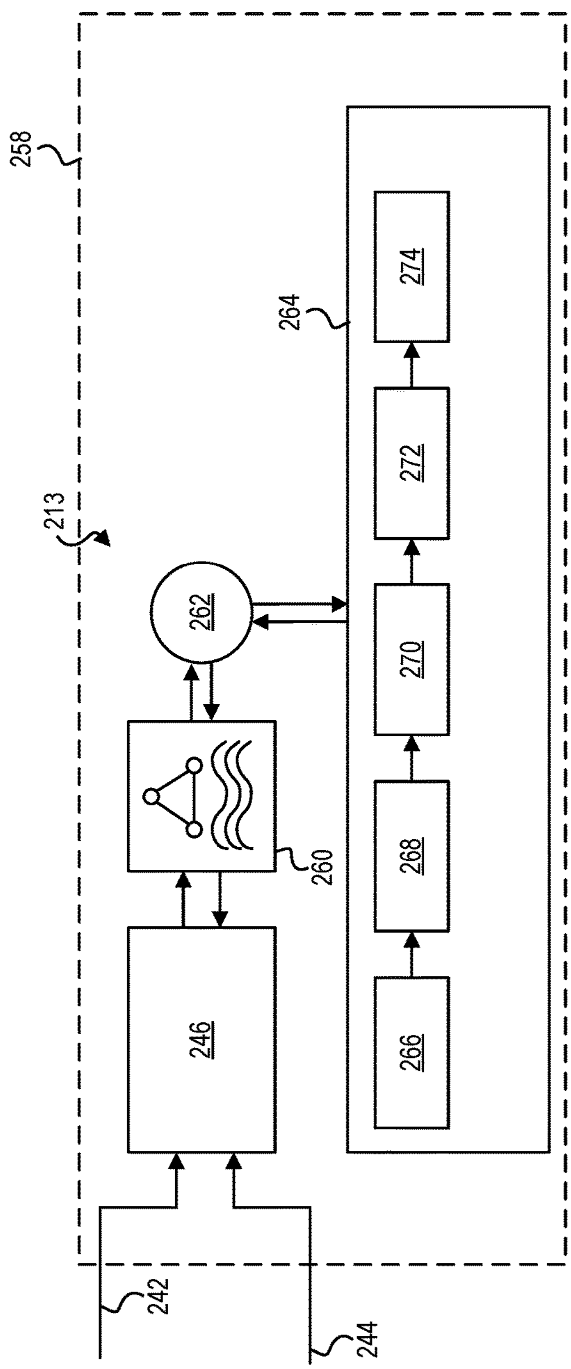
FIG. 2C is a detailed view of one of the nodes in the ATPS of FIG. 2A, in accordance with one approach.

Looking now to FIG. 2C, the sigma node 213 is used to form a sigma risk scoring module 258 having components therein that are configured to also generate a risk score for the current situation (e.g., event) being experienced. In comparison to the historical risk scoring module 240 of FIG. 2B, here the sigma risk scoring module 258 is configured to generate a risk score based on the number of predetermined rules that are broken by the current situation. For instance, the processing pipeline 264 may be configured to evaluate the number and/or type of rules that have been broken, and generate a relative sigma risk score that quantifies the likelihood that the broken rules will lead to a significant system error that impacts operational efficiency (e.g., system downtime).

Broken rules may be identified by the sigma risk scoring module 258 as a result of inspecting different types of alerts that are received. For instance, SIEM alerts 242 and/or EDR alerts 244 are also shown as being received at the sigma risk scoring module 258 (also referred to herein as a "sigma rule detection score module"). In some approaches, the same alerts 242, 244 may be received at each of the risk scoring modules, while in other approaches different types of alerts may be directed to specific ones of the scoring modules. As noted above, a magistrate 246 may be used to keep the different types of alerts separated and may also keep a record of the alerts that are received (e.g., in a lookup table).

From the magistrate 246, the received SIEM and EDR alerts are provided to a topic module 260. Again, the module 260 may be used to extract topic information from each of the alerts that are received, thereby providing insight into how each of the alerts may impact the system. These topics may be stored in memory in some approaches, while in other approaches, extracted topic information may be provided to endpoint 262, e.g., as will soon become apparent.

From module 260, the alerts are sent to endpoint 262. The different types of received alerts may be combined such that they are evaluated together by the microcode being run at endpoint 262. For instance, endpoint 262 may be running microcode at a particular point in the machine learning process to evaluate the received alerts and make a determination as to how likely they are to indicate an error will be experienced.

From endpoint 262, the evaluated alerts and corresponding information generated is provided to processing pipeline 264 for further evaluation. For instance, the processing pipeline 264 includes a domain object module 266 which may provide a framework that provides a convenient and uniform layer to access data from a wide range of data sources. Moreover, rule selection module 268 is used to select the rules that are to be upheld. These rules may be selected from a set of available options, rules predetermined by the current situation being evaluated, user preferences, a repository of potentially applicable sigma rules, etc. With respect to the present description, it should be noted that "sigma rules" is intended to refer to a collection of rules used for threat detection and security monitoring.

In some instances, the sigma rules are open source. Moreover, the sigma rules are designed to provide a standardized and structured method for describing log events and creating detection rules. These rules can hereby be used to search for patterns and IoCs in log data, making it easier to detect potential security threats. The sigma rules may be written in YAML format in some approaches. Moreover, the sigma rules may be written to detect a variety of different security threats, including malware, phishing, credential theft, etc. It follows that the rule selection module 268 may implement any desired number and/or type of sigma rules depending on the situation.

Pattern matching module 270 is further used to evaluate details of the received alerts, as well as the rule-based information output from the rule selection module 268. In some approaches, pattern matching module 270 implements natural language processing (NLP) to evaluate the textual information that is included in alerts, applied rules, user inputs, etc. This textual information is used to identify patterns, make correlations, develop predictions, etc.

The information evaluated by pattern matching module 270 is sent to risk scoring module 272 to generate a risk score for the current situation. Risk scoring module 272 may thereby evaluate information including: the received alerts, the details determined by pattern matching module 270 (e.g., patterns, correlations, predictions, etc.), rule-based information, etc. One or more trained machine learning models may be implemented by risk scoring module 272 to evaluate the number and/or type of rules that have been broken along with other received information, and determine a relative value that quantifies the likelihood that the broken rules will lead to a significant system error that impacts operational efficiency (e.g., system downtime). This relative value may thereby be output by the risk scoring module 272 as a sigma risk score. From risk scoring module 272, the risk score is sent to reasoning module 274 which further evaluates the risk score and determines whether corrective action should be taken to avoid any potential issues that may be caused by the current situation.

It follows that the sigma risk scoring module 258 is able to evaluate various details and generate a sigma risk score that quantifies the likelihood that rules broken in the current situation will lead to a significant system error that impacts operational efficiency. Again, microservices operating in the sigma risk scoring module 258 may use open-source rules to describe relevant log events related to command line values, process names, URLs, etc. For instance, a pattern matching engine may be used to determine the risk associated with each log event. According to one example, which is in no way intended to be limiting, the sigma risk scoring module 258 may use an application programming interface (API) which utilizes ANTLR as specifically tailored to the STIX 2.0 nomenclature. This pattern matching engine may be used by the backend to determine whether or not a sigma rule has been fired. However, to scan log events in this example, the input data is converted into the format of STIX domain objects 2.0 (SDOs). Therefore, the microservice will clean and extract the input data to construct and tag the SDO based on the given categories.

It follows that in situations where sigma rules are fired (e.g., failed), an API will provide a response that indicates the specific rule(s) that were triggered, along with the associated tactics and techniques. The risk scoring module 272 (e.g., engine) thereby computes a risk score based on the number of rules fired, the relative severity of the fired rules, TTP tags associated with a fired sigma rule, etc. Although not shown, the sigma risk scoring module 258 also normalizes the risk scores and provides an explanation on the underlying computation.

Figure 2D:
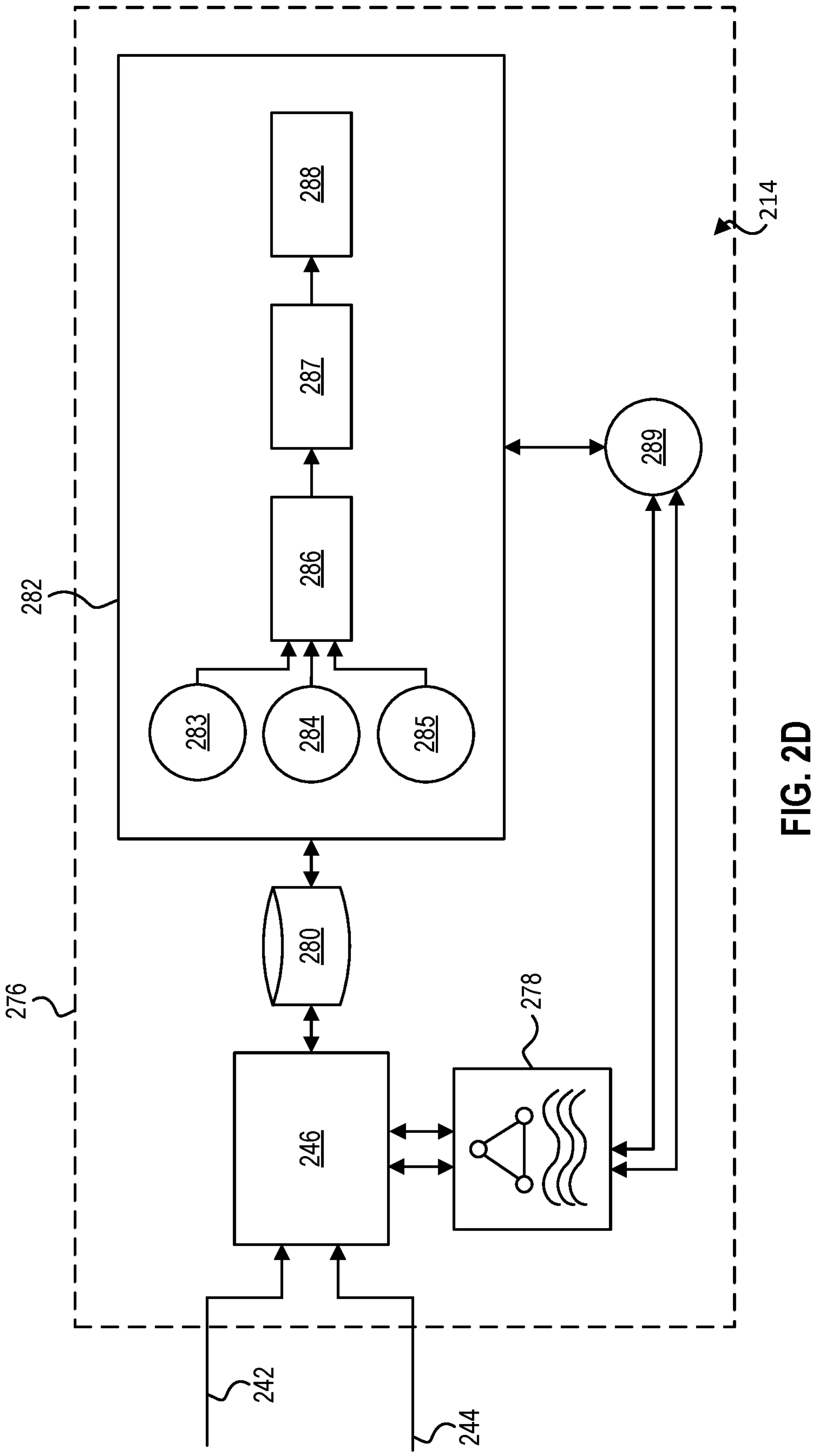
FIG. 2D is a detailed view of one of the nodes in the ATPS of FIG. 2A, in accordance with one approach.

Looking now to FIG. 2D, the anomaly detection node 214 is used to form an anomaly risk scoring module 276 having components therein that are configured to also generate a risk score for the current situation (e.g., event) being experienced. In comparison to the historical risk scoring module 240 of FIG. 2B and the sigma risk scoring module 258 of FIG. 2C, here the anomaly risk scoring module 276 is configured to generate a risk score based on whether details associated with the current situation deviate from expected results. For instance, the anomaly risk scoring module 276 may implement an unsupervised machine learning module 282 that is configured to detect anomalies in received alert data and generate a numeric score which represents a relative amount by which the given alert deviates from most data. It follows that the machine learning module 282 may initially be trained using historical alert datasets such that it may make predictions for newly received alerts, e.g., as will soon become apparent.

As shown SIEM alerts 242 and/or EDR alerts 244 are received at the magistrate 246 of the anomaly risk scoring module 276. As noted above, the same alerts 242, 244 may be received at each of the risk scoring modules in some approaches. Accordingly, at least some of the SIEM alerts 242 and/or EDR alerts 244 received at anomaly risk scoring module 276 may be the same as the alerts received at the historical risk scoring module 240 of FIG. 2B and/or the sigma risk scoring module 258 of FIG. 2C. In other approaches, different types of alerts may be directed to specific ones of the scoring modules.

As noted above, a magistrate 246 may be used to keep the different types of alerts separated and may also keep a record of the alerts that are received (e.g., in a lookup table). From the magistrate 246, the received SIEM and EDR alerts are provided to another topic module 278. As mentioned above, a module 278 may be used to extract topic information from each of the alerts that are received, thereby providing insight into how each of the alerts may impact the system. These topics may be stored in memory in some approaches, while in other approaches, extracted topic information may be provided to endpoint 289, e.g., as will soon become apparent.

It follows that during a data preparation phase, the magistrate 246 may clean the alerts and corresponding data. In other words, the magistrate 246 may be configured to clean, preprocess, and extract features from received alerts. In addition to cleaning newly received alerts during the prediction phase, this process may also be applied to training datasets during the modelling phase. Accordingly, the alert data output by magistrate 246 may be ready to be used for modelling and for prediction.

The magistrate 246 also sends the received alerts to memory 280 for storage. The alerts and related information may thereby be accumulated in memory 280 over time to develop an encompassing understanding of past alerts and how the system was ultimately impacted after receiving the different alerts. This historical information may further be provided to a machine learning module 282. As noted above, the machine learning module 282 may initially be trained using historical alert datasets such that the module 282 is configured to evaluate newly received alerts and make predictions on how the system will be impacted as a result.

For instance, three different classifiers 283, 284, 285 are used to evaluate received information. During a training phase, the historical data received from memory 280 may be evaluated by the classifiers 283, 284, 285 to determine how it impacted system performance. For instance, a different machine learning algorithm may be implemented by each of the classifiers 283, 284, 285. According to an example, the classifiers 283, 284, 285 may implement Isolation Forest, AutoEncoder, and Elliptic Envelope algorithms, respectively. Accordingly, each of the classifiers 283, 284, 285 may be trained to implement a unique model on a prepared dataset. It follows that the produced scores may be transformed to a same probability interval [0, 1], where 0 (zero) corresponds to the absolute normality of the alert, and 1 (one) corresponds to the absolute anomalousness of the alert.

Outputs from the classifiers 283, 284, 285 may be used by a decision module 286 to produce aligned scores. These aligned scores may further be used by scoring module 287 to calculate a single anomaly score for the current situation. According to some approaches, the single anomaly score may be calculated by simply determining the mean (average) value of the aligned scores. In other approaches, the scoring module 287 may calculate the score by determining a median value, a largest value, a weighted mean, etc. Results from the scoring module 287 are output to reasoning module 288, which may be used to evaluate the results that are produced. The machine learning module 282 may thereby be able to receive alert information corresponding to a situation and use a precomputed scoring model to detect whether a given alert is an "anomaly" or "not an anomaly," and to assign a numerical score as a measure of alert anomalousness, e.g., as would be appreciated by one skilled in the art after reading the present description.

The trained machine learning models in the machine learning model 282 may thereby be implemented at endpoint 289 to identify anomalies in received alert data corresponding to a current situation. Endpoint 289 may thereby also be able to assign corresponding anomaly scores to each of the alerts received and/or the current situation as a whole. To achieve this, the alert data may be formatted according to any data preparation phase specifications. The resulting outcome produced by endpoint 289 may thereby be a classification of whether each alert corresponds to an "anomaly" or "not an anomaly," as well as an anomaly risk score that corresponds thereto. In some approaches, a higher score indicates a greater degree of anomaly in the alert, but this is in no way intended to be limiting. Rather, in other approaches equivalent metrics may be applied while evaluating risk scores. For example, in some approaches a lower risk score indicates a greater degree of anomaly.

Figure 2E:
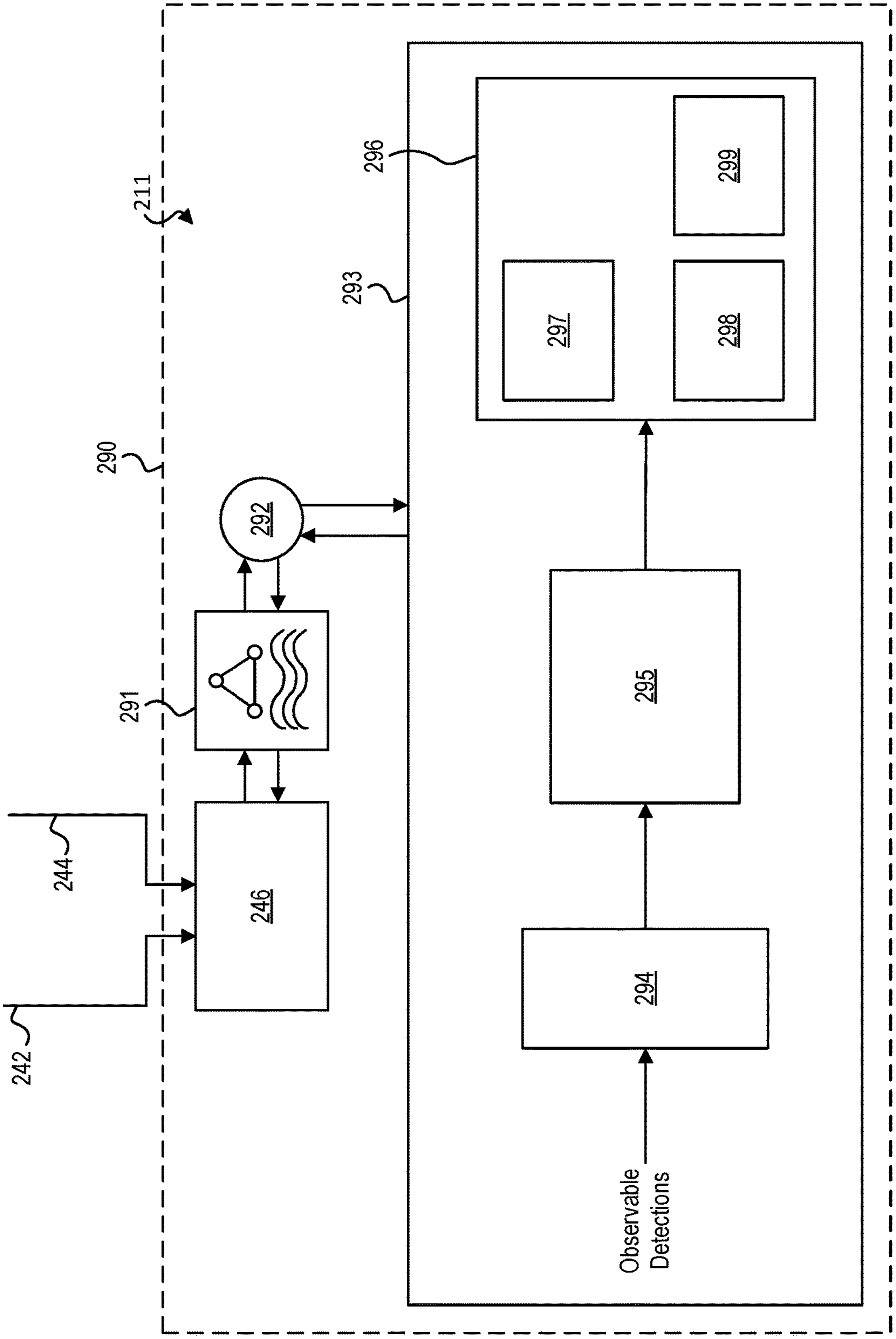
FIG. 2E is a detailed view of one of the nodes in the ATPS of FIG. 2A, in accordance with one approach.

Further still, in FIG. 2E the threat scoring node 211 is used to form a threat intelligence risk scoring module 290. As shown, the threat intelligence risk scoring module 290 (also referred to herein as an "IoC score module") includes components that are configured to generate another risk score that is used to quantify performance of the system under the current situation. This enrichment may be based on data provided by a threat intelligence service (TIS) which is able to leverage various data sources, e.g., including internal security research, external threat feeds, third-party intelligence sources, etc. Based on the sources that are used, TIS may provide the latest cybersecurity trend pertaining to the specific IoC in the form of intelligence reports. Given the ability to gather latest threat reports across many systems, the enrichment provided by a TIS risk scoring engine will further process each intelligence report and compute a score (value). The score may be set between two bounds depending on the approach. According to one example, scores may be computed such that the value is between 0 and 1.

As shown SIEM alerts 242 and/or EDR alerts 244 are received at the magistrate 246 of the threat intelligence risk scoring module 290. As noted above, a magistrate 246 may be used to keep the different types of alerts separated and may also keep a record of the alerts that are received (e.g., in a lookup table). From the magistrate 246, the received SIEM and EDR alerts are provided to another topic module 291. As mentioned above, a module 291 may be used to extract topic information from each of the alerts that are received, thereby providing insight into how each of the alerts may impact the system. These topics may be stored in memory in some approaches, while in other approaches, extracted topic information may be provided to endpoint 292 for evaluation.

Moreover, endpoint 292 may implement one or more of the machine learning models that are formed in processing module 293. Specifically, processing module 293 includes an observation module 294 configured to inspect operating conditions and identify undesirable situations. For example, observation module 294 may be configured to inspect incoming observable detection information and identify IoCs therein. The IoCs that are identified and extracted by observation module 294 may depend on the data fields that are passed. Depending on the alert type that is received (e.g., EDR or SIEM), certain combinations of IoCs may be desired. For example, the IoCs identified and extracted by the observation module 294 may include external Internet protocol (IP) address, MD5 hash values, SHA256 hash values, URL addresses, etc.

In response to identifying IoCs, a threat intelligence-based risk scoring module may be used to send the IoCs over to a TIS module 295. For instance, the IoCs may be sent to TIS module 295 in the form of enrichment queries. The TIS module 295 may investigate each raw report received along with the IoCs to determine the ratio in which a series of positive detected reports has been identified. Moreover, due to the vast breadth of TIS module 295, detected reports may be generated by a plethora of security technologies, including antivirus software and intrusion detection systems. It follows that in addition to calculating the detected report ratio, threat intelligence-based risk scoring may also retrieve the latest scan date to determine how current (or outdated) the severity of the threat report is.

From the TIS module 295, the evaluated information is sent to machine learning module 296 for further evaluation. For instance, a risk scoring engine 297 in machine learning module 296 may use both the calculated ratio and latest scan date for a given IoC, and apply a time decay equation to determine the relative overall riskiness of the IoC across multiple threat intelligence sources. Once each IoC is evaluated and a risk score is determined, the risk score consolidation module 298 combines the risk scores to create a combined risk score for the current situation. In some approaches, the combined risk score will be the maximum score of all IoCs identified by the TIS module 295. Furthermore, the embedded risk reasoning module 299 may be used to provide a detailed explanation on the risk computation and components produced by the risk scoring engine 297 and/or risk score consolidation module 298.

Figure 2F:
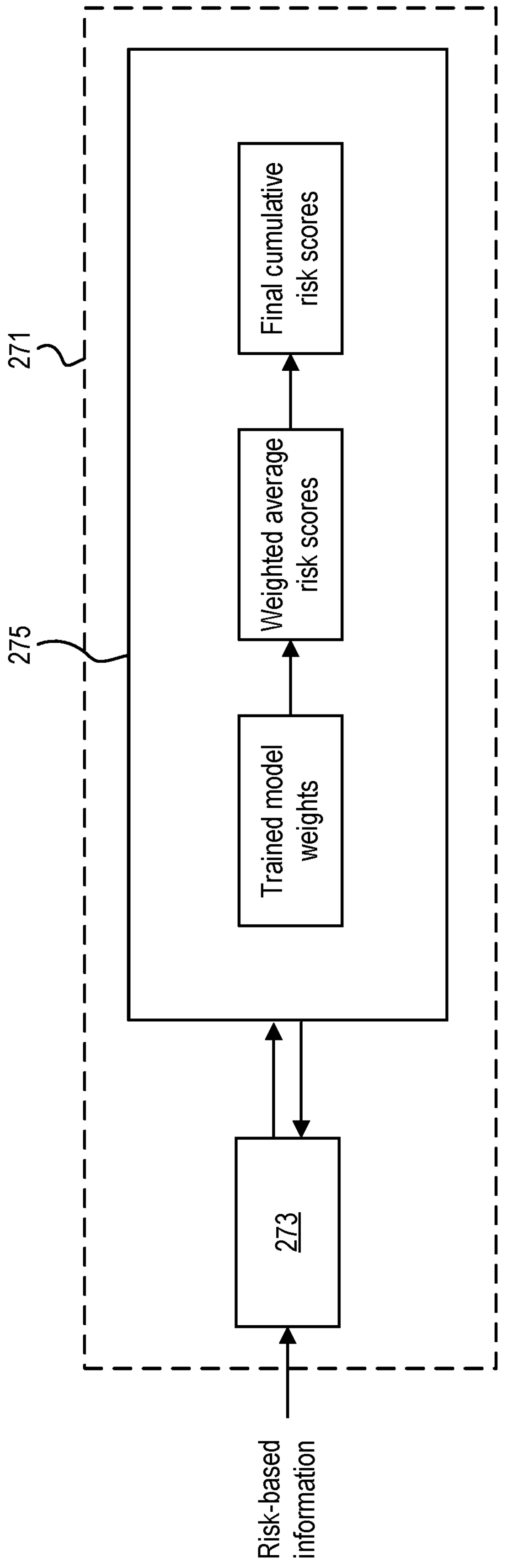
FIG. 2F is a detailed view of one of the nodes in the ATPS of FIG. 2A, in accordance with one approach.

Referring finally to FIG. 2F, the cumulative risk scoring node 219 is used to form a cumulative risk scoring module 271. As shown, risk-based information is received at a cumulative risk scoring endpoint 273 of the cumulative risk scoring module 271. Depending on the approach, the risk-based information that is received at cumulative risk scoring module 271 may include scored SIEM alerts, scored EDR alerts, user defined weights for the different alerts, lists of equivalent enrichment options, list of enrichment options to consider in forming the cumulative risk score, etc.

The cumulative risk scoring endpoint 273 may thereby evaluate the risk-based information that is received and determine an understanding of the corresponding situation and whether it is expected to cause issues with performance. From the cumulative risk scoring endpoint 273, requests (e.g., payloads) are sent to an interface pipeline 275 for processing. As shown, the interface pipeline 275 includes trained model weights, weighted average risk scores, as well as final cumulative risk scores. It follows that the various weights, risk scores, cumulative risk scores, etc. that are evaluated in the interface pipeline 275 may be able to generate a cumulative risk score in response to the payload provided by the cumulative risk scoring endpoint 273. Thus, the interface pipeline 275 returns a cumulative risk score to the cumulative risk scoring endpoint 273 for implementation.

It follows that the cumulative risk scoring module 271 may receive a set of enrichment service results and combine them into a single cumulative score, reducing the computational overhead, and allowing for the severity of an alert to be rapidly determined. Further still, the severity of an alert is represented in relation to other alerts. As noted above, this desirably allows for more serious (e.g., threatening) alerts to be processed before less serious alerts.

To achieve this, the cumulative risk scoring module 271 may effectively serve as an inference layer used to generate a final cumulative risk score for newly received alerts. This inference layer may first calculate a weighted score over all available enrichments. The model also calculates the cumulative risk score by taking the maximum over the weighted score, all deterministic enrichments, and any enrichments for which no learned weight exists.

Performance of the cumulative risk scoring module 271 was further evaluated in one example, using a Point-Biserial Correlation (PBC) statistic. This statistic measures the correlation between a numerical variable (e.g., the model prediction) and a categorial variable (e.g., the alert status, or the target). Through this evaluation, the Inventors were able to determine that the final cumulative risk score had a PBC statistic of 0.77, indicating a strong and desirable correlation between the predictions made by the models described herein, and the target variable.

To achieve this, the cumulative risk scoring module 271 may implement information gathered by a training layer. The training layer may use algorithms to evaluate the incoming information, e.g., such as the Random Forest Classifier algorithm, Permutation Importance algorithms, etc. The training layer uses these algorithms to learn appropriate weights for the different individual scores. For example, the Random Forest Classifier algorithm may be used to ensure the individual scores are able to make meaningful predictions on the overall outcome of the alert. Permutation Importance algorithms may also be used to calculate the individual weights for each of the individual scores. These algorithms evaluate the decrease in a model score when a single feature value is randomly shuffled. This procedure breaks the relationship between the feature and the target, and therefore a drop in the model score may be indicative of how much the model depends on the given feature. As a result, the importance of a feature (i.e., the individual enrichment score) may be used as an indicator of the weight to be assigned thereto.

Figure 3A:
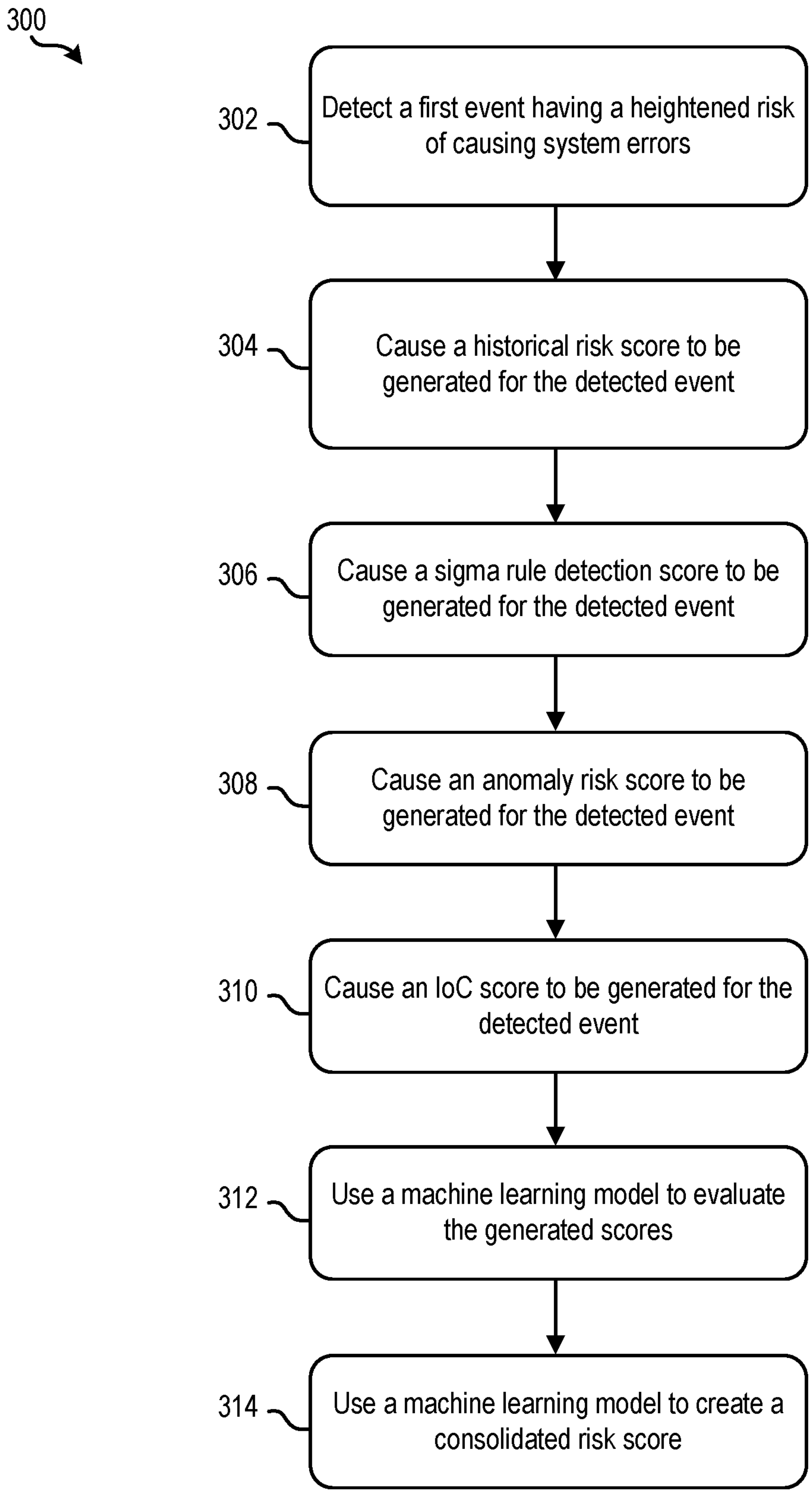
FIG. 3A is a flowchart of a method, in accordance with one approach.

Now referring to FIG. 3A, a flowchart of a method 300 for providing a comprehensive and accurate assessment of potential threats based on the current operating situation is shown according to one approach. The method 300 may be performed in accordance with the present invention in any of the environments depicted in FIGS. 1-2F, among others, in various approaches. For instance, one or more operations in method 300 may be performed by components in the ATPS 202 of FIG. 2A, e.g., such as machine learning model application layer 208. Moreover, more or less operations than those specifically described in FIG. 3A may be included in method 300, as would be understood by one of skill in the art upon reading the present descriptions.

Each of the steps of the method 300 may be performed by any suitable component of the operating environment using known techniques and/or techniques that would become readily apparent to one skilled in the art upon reading the present disclosure. For example, in various implementations, the method 300 may be partially or entirely performed by a controller (e.g., controller 230 of FIG. 2A), a processor (e.g., processor 224 of FIG. 2A), etc., or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3A, operation 302 of method 300 includes detecting a first event having a heightened risk of causing system errors. As noted above, an ATPS may be used to detect certain events which may cause issues in a system (e.g., such as cybersecurity events), and evaluate the threat they pose to an underlying system. Accordingly, operation 302 may include detecting a current cybersecurity event that is prone to causing cybersecurity related issues for a system. With respect to the present description, a "current cybersecurity event" may include a real-time (e.g., at least near real-time) event that could potentially impact the confidentiality, integrity, or availability of the information assets belonging to an organization. A non-exclusive list of examples include detecting malware in a computer system, receiving an incorrect login attempt from a user, receiving a request to perform a predetermined type of operation, etc. It follows that the severity of the cybersecurity event being experienced and which is detected, may vary depending on the approach.

Some approaches may even generate assessment of the events that can be used to direct corrective actions performed to overcome the cybersecurity events experienced. Accordingly, in response to a first event having a heightened risk of causing system errors being detected, method 300 proceeds to operation 304. There, operation 304 includes causing a historical risk score to be generated for the detected event. As noted above, the process of generating a historical risk score for a given event includes using a machine learning model. For instance, a trained machine learning model may be configured to compare the current cybersecurity event to historical (e.g., previous) events. It follows that operation 304 may include sending one or more instructions to a historical risk scoring module (e.g., see historical risk scoring module 240 of FIG. 2B).

By comparing a current cybersecurity event to previous events, the machine learning model may be able to identify similarities therebetween. Moreover, these similarities may be used to identify a relative risk associated with the current cybersecurity event causing issues to the system. Accordingly, the historical risk score may be determined based at least in part on the comparison between the current cybersecurity event and the historical events. Moreover, the actions taken in response to the historical events and the resulting impact on the system may be used to determine the relative risk of the current cybersecurity event, e.g., as would be appreciated by one skilled in the art after reading the present description.

In some approaches, comparing the cybersecurity event to the historical (e.g., previous) cybersecurity events includes comparing specific features of the different events. For instance, log severity scores, model escalation probabilities, rare scores, observable scores, and other features (e.g., values) of the events may be compared to identify any similarities therebetween.

Moreover, some approaches involve determining the historical risk score by applying a time decay to the historical cybersecurity events and the corresponding responses. The time decay is preferably used to assign a higher importance to historical events and responses that are more recent (e.g., relevant to the current event), while assigning a lower importance to events and responses that are from farther in the past.

Returning to FIG. 3A, method 300 advances from operation 304 to operation 306. There, operation 306 includes causing a sigma rule detection score to be generated for the detected event. As noted above, the process of generating a sigma rule detection score for a given event involves evaluating a number of predetermined rules and how the cybersecurity event impacts those rules. For instance, a number of predetermined sigma rules may be accumulated and compared against the operating conditions that result from the cybersecurity event being experienced. It follows that operation 306 may include sending one or more instructions to a sigma risk scoring module (e.g., see sigma risk scoring module 258 of FIG. 2C).

The process of generating a sigma rule detection score for the cybersecurity event involves identifying the number of rules that have been fired (e.g., violated) as a result of the cybersecurity event. In some approaches, rules that have been fired may be determined by inspecting tactics, techniques, and procedure (TTP) tags. These TTP tags may include behaviors, methods, or patterns of activity used by a threat actor, or group of threat actors.

It follows that the sigma rule detection score may be adjusted based on the severity of the rules that have been identified as being fired by the event. For example, the sigma rule detection score may be increased as the number of rules that have been fired increase. Similarly, the sigma rule detection score may be increased as the severity of the fired rules increase. Moreover, the sigma rule detection score may be decreased as the number and/or severity of the fired rules decrease. The determined sigma rule detection score may further be normalized in some instances. Normalizing the sigma rule detection score may produce an explanation that outlines the underlying computation, e.g., as would be appreciated by one skilled in the art after reading the present description.

FIG. 3A further depicts method 300 proceeding from operation 306 to operation 308. There, operation 308 includes causing an anomaly risk score to be generated for the detected event. As noted above, the process of generating an anomaly risk score for a given event involves determining whether any anomalies exist in the information associated with the cybersecurity event. For instance, operational details associated with the cybersecurity event may be inspected and compared against expected (e.g., average) values to determine whether any anomalies were experienced. It follows that operation 308 may include sending one or more instructions to an anomaly risk scoring module (e.g., see anomaly risk scoring module 276 of FIG. 2D).

Again, information associated with the cybersecurity event is preferably inspected to determine whether any deviations from intended performance occurred. In response to identifying anomalies in the inspected information, numeric values indicating an amount that the respective anomaly deviates from a majority (e.g., remainder) of the information associated with the cybersecurity event, are determined for each of the anomalies. It follows that the greater an anomaly deviates from expected performance, the greater the corresponding numeric value may be. Similarly, the closer an anomaly is to expected performance, the smaller the numeric value may be. These numeric values may thereby be used as anomaly risk scores for the cybersecurity event, e.g., as described above with respect to FIGS. 2A and 2D.

Further still, method 300 of FIG. 3A advances from operation 308 to operation 310, which includes causing an IoC score to be generated for the detected event. As noted above, the process of generating an IoC score for a given event involves inspecting information associated with the cybersecurity event and determining whether any IoCs are included therein. Moreover, the IoCs that are identified and extracted may depend on the data fields that are received. Depending on the alert type that is received (e.g., EDR or SIEM), certain combinations of IoCs may be desired. For example, the IoCs identified and extracted may include external Internet protocol (IP) address, MD5 hash values, SHA256 hash values, URL addresses, etc. It follows that operation 310 may include sending one or more instructions to a threat intelligence risk scoring module (e.g., see threat intelligence risk scoring module 290 of FIG. 2E).

It follows that the process of generating an IoC score for the cybersecurity event involves inspecting information associated with the cybersecurity event. In response to identifying one or more types of IoCs in the information, the identified IoCs may be compared to information associated with historical (e.g., previous) cybersecurity events. It should also be noted that the one or more types of IoCs identified in the information are determined based on the type of cybersecurity event that was detected.

Again, by comparing a current event to events that occurred in the past, method 300 is able to actively respond to the cybersecurity event with confidence based on the identified similarities with past events. Thus, IoC scores may be based at least in part on identified overlaps with the information associated with historical cybersecurity events, e.g., as would be appreciated by one skilled in the art after reading the present description.

Referring still to FIG. 3A, operation 312 of method 300 further includes using a machine learning model to evaluate the generated scores. In other words, operation 312 includes using one or more trained machine learning models to evaluate the historical risk score, the sigma rule detection score, the anomaly risk score, the IoC score, and/or combinations thereof. Additionally, operation 314 includes using a machine learning model to create a consolidated risk score. As noted above, the consolidated risk score may be determined based on the cybersecurity event, the consolidated risk score incorporating the historical risk score, the sigma rule detection score, the anomaly risk score, the IoC score, or any other desired information. It follows that operations 312 and 314 may include sending one or more instructions to a cumulative risk scoring module (e.g., see cumulative risk scoring module 271 of FIG. 2F).

Figure 3B:
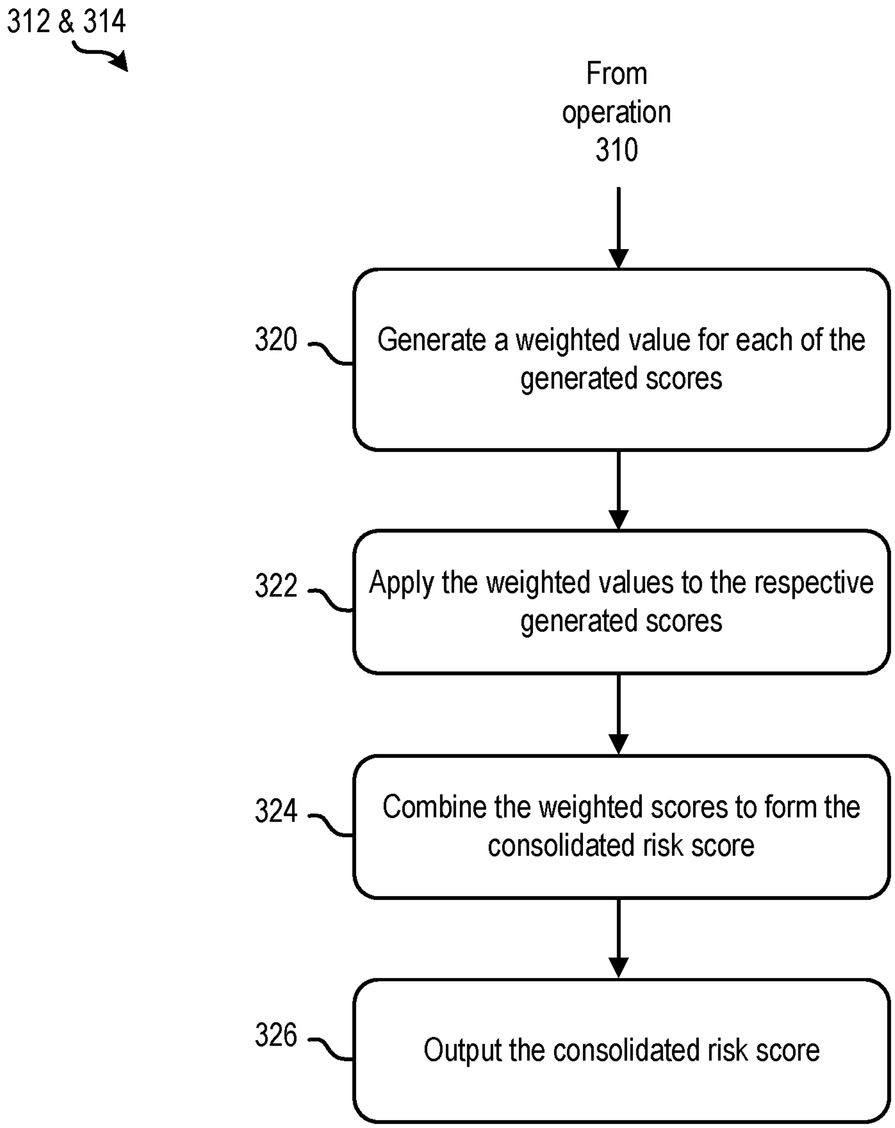
FIG. 3B is a flowchart of sub-processes for one of the operations in the method of FIG. 3A, in accordance with one approach.

Looking to FIG. 3B, exemplary sub-operations of evaluating different risk scores and creating a consolidated risk score are illustrated in accordance with one approach. It follows that one or more of the sub-operations in FIG. 3B may be used to perform operation 312 and/or operation 314 of FIG. 3A. However, it should be noted that the sub-operations of FIG. 3B are illustrated in accordance with one approach which is in no way intended to limit the invention.

As shown, sub-operation 320 includes generating a weighted value for each of the generated scores. In other words, sub-operation 320 includes generating a weighted value for the historical risk score, the sigma rule detection score, the anomaly risk score, and the IoC score determined in method 300. As noted above, different weighing values may be applied to different types of risk scores.

For instance, one or more machine learning models that have been trained to apply weights to each type of risk score. In some approaches, the weights are predetermined (e.g., by a user) for each of the different types of risk scores. Accordingly, the process of generating the weighted values for the risk scores may simply involve referencing a lookup table in some approaches. In other approaches, requests may be sent to users, running applications, machine learning models, etc., to produce the weighting values.

According to some approaches, a weighted value may be determined for a given risk score by identifying an amount that the given score changes in response to a single feature value being randomly shuffled. In other words, machine learning models evaluate the amount that a model score decreases in response to a single feature value being randomly shuffled. This procedure effectively breaks the relationship between the feature and the target. Accordingly, a decrease in the model score indicates the amount by which the given model depends on the feature. As a result, the importance of the feature (e.g., the "individual enrichment score") may be used as an indicator of the appropriate weight that should be assigned to the risk score given the current situation.

It follows that in some approaches, the risk scores may be weighted by evaluating received information and comparing certain portions to each other and/or historical information associated with previous performance. As a result, a prediction may be made as to how much a given situation is predicted to impact the performance of the system. This evaluation and prediction may further be used to generate an accurate understanding of what risks different situations (such as cybersecurity attacks) pose to the system as a whole and/or specific portions thereof.

Proceeding to sub-operation 322, the weighted values are applied to the respective generated scores. In other words, sub-operation 322 includes applying the weighted values to each of the respective: historical risk score, sigma rule detection score, anomaly risk score, and IoC score. Furthermore, sub-operation 324 includes combining the weighted scores to form the consolidated risk score, while sub-operation 326 includes outputting the consolidated risk score to an intended target location. It follows that the consolidated risk score may be weighted in some approaches to emphasize certain risk scores and/or reduce the effects of other risk scores, e.g., depending on the current situation being experienced by the system. Moreover, the machine learning models used to create the consolidated risk score or any portions thereof may be trained using random forest classifiers and/or permutation importance algorithms to generate weighted values for each of the historical risk score, the sigma rule detection score, the anomaly risk score, and the IoC score, e.g., as would be appreciated by one skilled in the art after reading the present description.

Returning now to FIG. 3A, it follows that method 300 has been able to improve the efficiency by which events like cybersecurity events are evaluated and responded to (e.g., overcome) in real-time. As noted above, machine learning models are trained using information corresponding to previously experienced cybersecurity events. Moreover, these machine learning models may be used to evaluate cybersecurity events as they occur.

Implementations herein are thereby able to provide an intelligent system that is able to utilize artificial intelligence to automatically evaluate events and calculate the consolidated risk to cybersecurity from different indicators, including historical risk. Systems herein are thereby dynamic enough to add new, and remove redundant, indicators of risk. Implementations herein are also able to apply suitable weights to each risk score. Approaches herein are thereby able to ensure a more efficient and effective security response to potentially harmful events. This can significantly minimize the risk of cybersecurity threats to computer systems and networks.

It follows that in sharp contrast to the shortcomings of conventional products, implementations herein are able to provide a comprehensive and accurate assessment of potential security threats. For instance, an ATPS may be used to detect undesirable (e.g., cybersecurity) events that occur, and evaluate the threat they pose to an underlying system. Some approaches may even generate assessment of the events that can be used to direct corrective actions performed to overcome the cybersecurity events experienced. In other words, approaches herein can develop an understanding of events that impact the settings (e.g., cybersecurity) of a system, and use that understanding to efficiently respond to situations and restore operational efficiency to the system. Trained machine learning models may be used to develop an understanding of events that contributed to the cybersecurity event.

It should also be noted that while various approaches have been described herein in the context of cybersecurity events, the same or similar processes may be applied to other types of events that are experienced. For example, any of the approaches herein may be implemented in the process of performing endpoint security monitoring at a user device.

According to an in-use example, which is in no way intended to limit the invention, an OpenShift deployment architecture may include a model training component and a model serving component. Both training and serving components are deployed as OpenShift operators that can be decomposed into a set of multi-container services responsible for the complex instantiation and management of an entire ATPS system. The process involves automating deployment, configuration, scaling, and monitoring of the disparate components of the system in a way that allows them to work together seamlessly to provide the desired functionality.

Moreover, machine learning models may be served in a scalable fashion over a remote procedure calls (RPC) interface (e.g., such as gRPC) for remote procedural calls. This allows for efficient serialization and deserialization of complex data types and enabling the possibility of handling large volumes of requests in real-time. In these approaches, the serving operator automatically scales pods horizontally to accommodate request volume based on the observed CPU utilization. A framework may also be chosen for serving models which preferably simplifies deploying and managing multiple machine learning models at scale, e.g., such as Kubernetes deployments and/or stateful sets. Furthermore, it provides tools for managing the entire lifecycle of machine learning models.

After completing each training process successfully, the corresponding microservice may be evaluated against a Promotion Logic, e.g., a set of criteria to determine whether the model is acceptable to be utilized in production. These criteria include performance and governance metrics to ensure that each promoted model is effective and compliant with the specific scenario (e.g., application). Users can create and dynamically change the settings appropriate for their use cases for each training microservice. Upon successful promotion, models are pushed to cloud storage, where a serving operator accesses them.

Furthermore, the operator may deploy a user interface to provide a visual and interactive way for users (e.g., developers) to engage with the backend components of the operators. This greatly simplifies the complex workflows and reduces the cognitive load for users. Furthermore, it provides access to specific capabilities of the training process to different tiers of users, the ability to visualize the entire system, as well as a quick and effective method of triaging the system as a whole in the case of any problem arising. As a result, developers can quickly trigger training jobs and monitor application logs without the need to instantiate a YAML custom resource at the OpenShift level, e.g., as will be appreciated by one skilled in the art after reading the present description.

Figure 4:
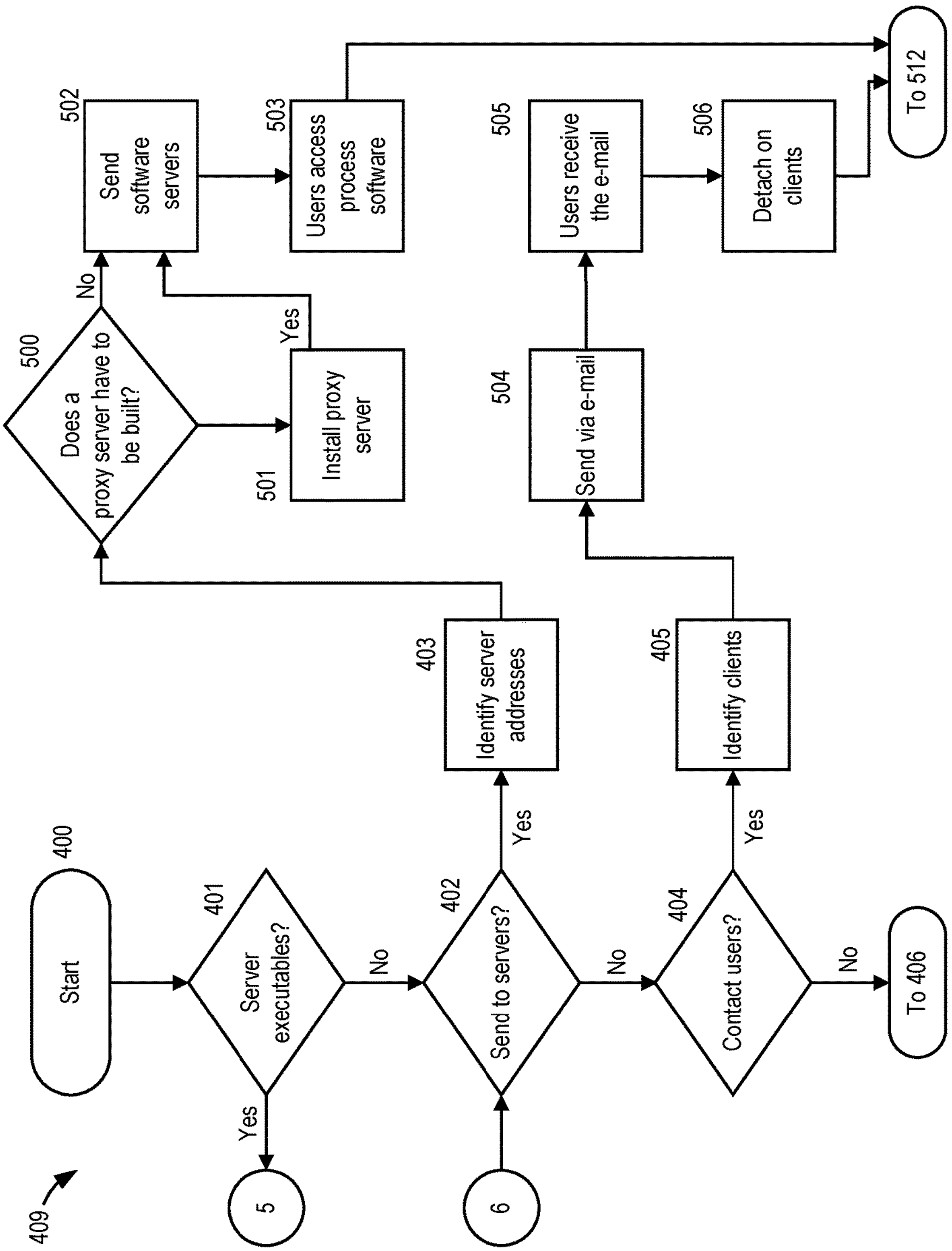
FIG. 4 is a flowchart of a method, in accordance with one approach.
Figure 4:
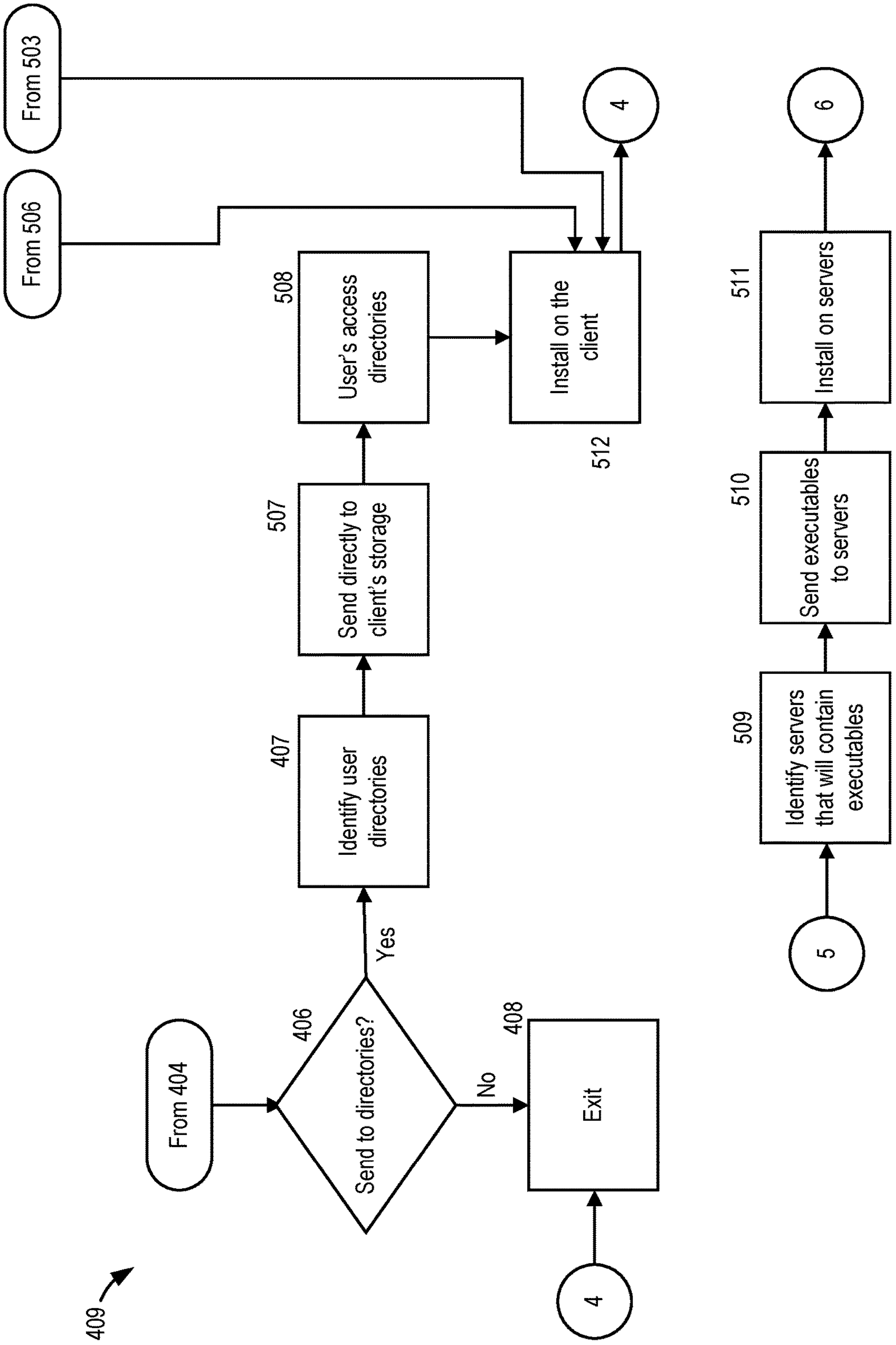

Now referring to FIG. 4, a flowchart of a method 409 is shown according to one approach. The method 409 may be performed in accordance with the present invention in any of the environments depicted in FIGS. 1-3B, among others, in various approaches. Of course, more or fewer operations than those specifically described in FIG. 4 may be included in method 409, as would be understood by one of skill in the art upon reading the present descriptions.

Each of the steps of the method 409 may be performed by any suitable component of the operating environment. For example, in various approaches, the method 409 may be partially or entirely performed by a processing circuit, e.g., such as an IaC access manager, or some other device having one or more processors therein. The processor, e.g., processing circuit(s), chip(s), and/or module(s) implemented in hardware and/or software, and preferably having at least one hardware component, may be utilized in any device to perform one or more steps of the method 409. Illustrative processors include, but are not limited to, a central processing unit (CPU), an application specific integrated circuit (ASIC), a field programmable gate array (FPGA), etc., combinations thereof, or any other suitable computing device known in the art.

While it is understood that the process software associated with providing a comprehensive and accurate assessment of potential threats based on the current operating situation, may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

With continued reference to method 409, step 400 begins the deployment of the process software. An initial step is to determine if there are any programs that will reside on a server or servers when the process software is executed (401). If this is the case, then the servers that will contain the executables are identified (509). The process software for the server or servers is transferred directly to the servers' storage via FTP or some other protocol or by copying through the use of a shared file system (510). The process software is then installed on the servers (511).

Next, a determination is made on whether the process software is to be deployed by having users access the process software on a server or servers (402). If the users are to access the process software on servers, then the server addresses that will store the process software are identified (403).

A determination is made if a proxy server is to be built (500) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (501). The process software is sent to the (one or more) servers either via a protocol such as FTP, or it is copied directly from the source files to the server files via file sharing (502). Another approach involves sending a transaction to the (one or more) servers that contained the process software, and have the server process the transaction and then receive and copy the process software to the server's file system. Once the process software is stored at the servers, the users, via their client computers, then access the process software on the servers and copy to their client computers file systems (503). Another approach is to have the servers automatically copy the process software to each client and then run the installation program for the process software at each client computer. The user executes the program that installs the process software on the client computer (512) and then exits the process (408).

In step 404 a determination is made whether the process software is to be deployed by sending the process software to users via e-mail. The set of users where the process software will be deployed are identified together with the addresses of the user client computers (405). The process software is sent via e-mail (504) to each of the users' client computers. The users then receive the e-mail (505) and then detach the process software from the e-mail to a directory on their client computers (506). The user executes the program that installs the process software on the client computer (512) and then exits the process (408).

Lastly, a determination is made on whether the process software will be sent directly to user directories on their client computers (406). If so, the user directories are identified (407). The process software is transferred directly to the user's client computer directory (507). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (508). The user executes the program that installs the process software on the client computer (512) and then exits the process (408).

It will be clear that the various features of the foregoing systems and/or methodologies may be combined in any way, creating a plurality of combinations from the descriptions presented above.

It will be further appreciated that implementations of the present invention may be provided in the form of a service deployed on behalf of a customer to offer service on demand.

The descriptions of the various implementations of the present invention have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical improvement over technologies found in the marketplace, or to enable others of ordinary skill in the art to understand the implementations disclosed herein.

What is claimed is:

1. A computer-implemented method, comprising, in response to detecting a current cybersecurity event:

causing a historical risk score to be generated for the current cybersecurity event, wherein the current cybersecurity event comprises a real-time event impacting availability of information assets belonging to an organization accessed through a network;

causing a sigma rule detection score to be generated for the current cybersecurity event;

causing an anomaly risk score to be generated for the current cybersecurity event;

causing an Indicator of Compromise (IoC) score to be generated for the current cybersecurity event; and using a machine learning model to:

evaluate the historical risk score, the sigma rule detection score, the anomaly risk score, and the IoC score to determine a predicted threat of impact on the information assets, and create a consolidated risk score corresponding to weighted values for: the current cybersecurity event, the consolidated risk score incorporating the historical risk score, the sigma rule detection score, the anomaly risk score, and the IoC score based on the predicted threat of impact.

2. The computer-implemented method of claim 1, wherein causing the historical risk score to be generated for the current cybersecurity event includes:

using a second machine learning model to compare the current cybersecurity event to historical cybersecurity events; and determining the historical risk score based at least in part on the comparison and the comparing corresponding responses to the historical cybersecurity events.

3. The computer-implemented method of claim 2, wherein determining the historical risk score includes:

applying a time decay to the historical cybersecurity events and the corresponding responses.

4. The computer-implemented method of claim 1, wherein causing the sigma rule detection score to be generated for the current cybersecurity event includes:

identifying a number of rules that have been fired as a result of the current cybersecurity event;

determining a risk score based at least in part on the number of fired rules; and normalizing the determined risk score.

5. The computer-implemented method of claim 1, wherein causing the anomaly risk score to be generated for the current cybersecurity event includes:

inspecting information associated with the current cybersecurity event;

identifying anomalies in the information; and determining a numeric value for each of the anomalies, the numeric values indicating an amount that the respective anomaly deviates from a majority of the information associated with the current cybersecurity event.

6. The computer-implemented method of claim 1, wherein causing the IoC score to be generated for the current cybersecurity event includes:

inspecting information associated with the current cybersecurity event;

identifying one or more types of IoCs in the information;

comparing the identified IoCs to information associated with historical cybersecurity events; and determining the IoC score based at least in part on overlaps between the identified IoCs and the information associated with the historical cybersecurity events, wherein the one or more types of IoCs identified in the information are determined based on the current cybersecurity event.

7. The computer-implemented method of claim 1, wherein using the machine learning model to create the consolidated risk score includes:

generating a weighted value for each of: the historical risk score, the sigma rule detection score, the anomaly risk score, and the IoC score;

applying the weighted values to the respective historical risk score, sigma rule detection score, anomaly risk score, and IoC score; and combining the weighted historical risk score, the weighted sigma rule detection score, the weighted anomaly risk score, and the weighted IoC score to form the consolidated risk score.

8. The computer-implemented method of claim 7, wherein the machine learning model is trained using random forest classifiers and/or permutation importance algorithms to generate weighted values for each of the historical risk score, the sigma rule detection score, the anomaly risk score, and the IoC score.

9. The computer-implemented method of claim 1, wherein the historical risk score, the sigma rule detection score, and the anomaly risk score are generated by an advanced threat prioritization system having a historical risk score module configured to generate the historical risk score, a sigma rule detection score module configured to generate the sigma rule detection score, an anomaly risk score module configured to generate the anomaly risk score, and an IoC score module configured to generate the IoC score.

10. A computer program product, comprising a computer readable storage medium having program instructions embodied therewith, the program instructions readable by a processor, executable by the processor, or readable and executable by the processor, to cause the processor to, in response to detecting a current cybersecurity event:

cause a historical risk score to be generated for the current cybersecurity event, wherein the current cybersecurity event comprises a real-time event impacting availability of information assets belonging to an organization accessed through a network;

cause a sigma rule detection score to be generated for the current cybersecurity event;

cause an anomaly risk score to be generated for the current cybersecurity event;

cause an Indicator of Compromise (IoC) score to be generated for the current cybersecurity event; and use a machine learning model to:

evaluate the historical risk score, the sigma rule detection score, the anomaly risk score, and the IoC score to determine a predicted threat of impact on the information assets, and create a consolidated risk score corresponding to weighted values for: the current cybersecurity event, the consolidated risk score incorporating the historical risk score, the sigma rule detection score, the anomaly risk score, and the IoC score based on the predicted threat of impact.

11. The computer program product of claim 10, wherein causing the historical risk score to be generated for the current cybersecurity event includes:

using a second machine learning model to compare the current cybersecurity event to historical cybersecurity events; and determining the historical risk score based at least in part on comparing corresponding responses to the historical cybersecurity events.

12. The computer program product of claim 11, wherein determining the historical risk score includes:

applying a time decay to the historical cybersecurity events and the corresponding responses.

13. The computer program product of claim 10, wherein causing the sigma rule detection score to be generated for the current cybersecurity event includes:

identifying a number of rules that have been fired as a result of the current cybersecurity event;

determining a risk score based at least in part on the number of fired rules; and normalizing the determined risk score.

14. The computer program product of claim 10, wherein causing the anomaly risk score to be generated for the current cybersecurity event includes:

inspecting information associated with the current cybersecurity event;

identifying anomalies in the information; and determining a numeric value for each of the anomalies, the numeric values indicating an amount that the respective anomaly deviates from a majority of the information associated with the current cybersecurity event.

15. The computer program product of claim 10, wherein causing the IoC score to be generated for the current cybersecurity event includes:

inspecting information associated with the current cybersecurity event;

identifying one or more types of IoCs in the information;

comparing the identified IoCs to information associated with historical cybersecurity events; and determining the IoC score based at least in part on overlaps between the identified IoCs and the information associated with the historical cybersecurity events, wherein the one or more types of IoCs identified in the information are determined based on the current cybersecurity event.

16. The computer program product of claim 10, wherein using the machine learning model to create the consolidated risk score includes:

generating a weighted value for each of: the historical risk score, the sigma rule detection score, the anomaly risk score, and the IoC score;

applying the weighted values to the respective historical risk score, sigma rule detection score, anomaly risk score, and IoC score; and combining the weighted historical risk score, the weighted sigma rule detection score, the weighted anomaly risk score, and the weighted IoC score to form the consolidated risk score.

17. The computer program product of claim 16, wherein the machine learning model is trained using random forest classifiers and/or permutation importance algorithms to generate weighted values for each of the historical risk score, the sigma rule detection score, the anomaly risk score, and the IoC score.

18. An advanced threat prioritization system, comprising:

a processor; and logic integrated with the processor, executable by the processor, or integrated with and executable by the processor, the logic being configured to, in response to detecting a current cybersecurity event:

cause a historical risk score to be generated for the current cybersecurity event, wherein the current cybersecurity event comprises a real-time event impacting availability of information assets belonging to an organization accessed through a network;

cause a sigma rule detection score to be generated for the current cybersecurity event;

cause an anomaly risk score to be generated for the current cybersecurity event;

cause an Indicator of Compromise (IoC) score to be generated for the current cybersecurity event; and use a machine learning model to:

evaluate the historical risk score, the sigma rule detection score, the anomaly risk score, and the IoC score to determine a predicted threat of impact on the information assets, and create a consolidated risk score corresponding to weighted values for: the current cybersecurity event, the consolidated risk score incorporating the historical risk score, the sigma rule detection score, the anomaly risk score, and the IoC score based on the predicted threat of impact.

19. The advanced threat prioritization system of claim 18, wherein causing the historical risk score to be generated for the current cybersecurity event includes:

using a second machine learning model to compare the current cybersecurity event to historical cybersecurity events; and determining the historical risk score based at least in part on comparing corresponding responses to the historical cybersecurity events, wherein comparing the current cybersecurity event to the historical cybersecurity events includes comparing features selected from the group consisting of: log severity scores, model escalation probabilities, rare scores, and observable scores.

20. The advanced threat prioritization system of claim 18, wherein causing the sigma rule detection score to be generated for the current cybersecurity event includes:

identifying a number of rules that have been fired as a result of the current cybersecurity event;

determining a risk score based at least in part on the number of fired rules; and normalizing the determined risk score.

21. The advanced threat prioritization system of claim 18, wherein causing the anomaly risk score to be generated for the current cybersecurity event includes:

inspecting information associated with the current cybersecurity event;

identifying anomalies in the information; and determining a numeric value for each of the anomalies, the numeric values indicating an amount that the respective anomaly deviates from a majority of the information associated with the current cybersecurity event.

22. The advanced threat prioritization system of claim 18, wherein causing the IoC score to be generated for the current cybersecurity event includes:

inspecting information associated with the current cybersecurity event;

identifying one or more types of IoCs in the information;

comparing the identified IoCs to information associated with historical cybersecurity events; and determining the IoC score based at least in part on overlaps between the identified IoCs and the information associated with the historical cybersecurity events, wherein the one or more types of IoCs identified in the information are determined based on the current cybersecurity event.

23. The advanced threat prioritization system of claim 18, wherein using the machine learning model to create the consolidated risk score includes:

generating a weighted value for each of: the historical risk score, the sigma rule detection score, the anomaly risk score, and the IoC score;

applying the weighted values to the respective historical risk score, sigma rule detection score, anomaly risk score, and IoC score; and combining the weighted historical risk score, the weighted sigma rule detection score, the weighted anomaly risk score, and the weighted IoC score to form the consolidated risk score.

* * * * *